(12) United States Patent
Haibel

(10) Patent No.: US 8,251,243 B2
(45) Date of Patent: Aug. 28, 2012

(54) CLOSURE HAVING A SEGMENTED LOCKING RING

(75) Inventor: Joshua A. Haibel, Louisville, KY (US)

(73) Assignee: Sypris Technologies, Inc., Louisville, KY (US)

( * ) Notice: Subject to any disclaimer, the term of this patent is extended or adjusted under 35 U.S.C. 154(b) by 47 days.

(21) Appl. No.: 12/681,384

(22) PCT Filed: Jun. 9, 2008

(86) PCT No.: PCT/US2008/066319
§ 371 (c)(1),
(2), (4) Date: Apr. 2, 2010

(87) PCT Pub. No.: WO2009/045574
PCT Pub. Date: Apr. 9, 2009

(65) Prior Publication Data
US 2010/0206878 A1  Aug. 19, 2010

Related U.S. Application Data

(63) Continuation-in-part of application No. 12/021,886, filed on Jan. 29, 2008, now abandoned.

(60) Provisional application No. 60/976,997, filed on Oct. 2, 2007.

(51) Int. Cl.
*B65D 45/34* (2006.01)

(52) U.S. Cl. ........ 220/321; 220/213; 220/316; 220/320; 220/263; 220/835; 220/833; 220/240; 49/465; 292/256.65

(58) Field of Classification Search ............ 220/321, 220/234, 213, 240, 833, 835, 263, 319; 292/256.65; 49/465; 411/519
See application file for complete search history.

(56) References Cited

U.S. PATENT DOCUMENTS

| | | | |
|---|---|---|---|
| 1,339,905 | A | 5/1920 | O'Connor |
| 2,040,024 | A | 5/1936 | Roberts |
| 2,158,218 | A | 5/1939 | Brouhon |
| 2,180,606 | A | 11/1939 | Oys et al. |
| 2,558,220 | A | 6/1951 | McLachlan |
| 2,616,587 | A | 11/1952 | Petch |
| 2,721,094 | A | 10/1955 | Webster |

(Continued)

FOREIGN PATENT DOCUMENTS
EP  0129349  12/1984
(Continued)

OTHER PUBLICATIONS

Pipeline Equipment, Inc., Twinlock Closure; Sales Brochure, undated, pp. 1-2, Pipeline Equipment, Inc., Tulsa, OK USA.

*Primary Examiner* — J. Gregory Pickett
*Assistant Examiner* — Raven Collins
(74) *Attorney, Agent, or Firm* — James E. Cole; Middleton Reutlinger

(57) ABSTRACT

A closure (100) having a hub (102) and pivotally connected head (104). The head is locked in a closed position within the hub by a locking ring (106). The locking ring is polygonal in shape and includes a substantially cylindrical surface and a conical surface. The device further includes a pressure warning device (126) which has a secondary function as a locking mechanism inhibiting unintentional opening of the head when the system is pressurized.

31 Claims, 25 Drawing Sheets

U.S. PATENT DOCUMENTS

| | | |
|---|---|---|
| 3,449,860 A | 6/1969 | Franks, Jr. et al. |
| 3,539,212 A | 11/1970 | Poltorak |
| 3,667,649 A | 6/1972 | Thillet |
| 4,102,474 A | 7/1978 | Platts |
| 4,140,240 A | 2/1979 | Platts |
| 4,152,871 A | 5/1979 | Kardash, Jr. |
| 4,222,147 A | 9/1980 | Burnett, Jr. |
| 4,315,577 A | 2/1982 | Bernson, Jr. |
| 4,339,843 A | 7/1982 | Burnett, Jr. |
| 4,387,740 A | 6/1983 | Vanzant |
| 4,422,651 A | 12/1983 | Platts |
| 4,515,287 A | 5/1985 | Baudoux et al. |
| 4,627,763 A | 12/1986 | Roemer et al. |
| 4,693,278 A | 9/1987 | Wilson et al. |
| 4,815,163 A | 3/1989 | Simmons |
| 4,815,627 A | 3/1989 | Marshall |
| 4,883,637 A | 11/1989 | McDaniels, Jr. |
| 4,920,609 A | 5/1990 | Lin |
| 5,035,321 A | 7/1991 | Denton |
| 5,127,535 A | 7/1992 | Shinno |
| 5,207,398 A | 5/1993 | Veaux et al. |
| 5,700,043 A | 12/1997 | Rohard et al. |
| 5,743,575 A | 4/1998 | McFarland |
| 6,200,123 B1 | 3/2001 | Mailliet et al. |
| 6,293,051 B1 | 9/2001 | Matye |
| 6,308,995 B1 | 10/2001 | Simson |
| 6,439,415 B1 | 8/2002 | Salim et al. |
| 6,786,670 B2 | 9/2004 | Smith |
| 6,857,536 B2 | 2/2005 | Smith |
| 7,036,674 B2 | 5/2006 | McGuire |
| 7,051,897 B2 | 5/2006 | McGuire |
| 7,118,472 B2 | 10/2006 | Kennedy et al. |
| 7,341,161 B2 | 3/2008 | McGuire |
| 7,669,730 B2 | 3/2010 | Lopez |
| 2005/0161957 A1* | 7/2005 | McGuire ................... 292/288 |
| 2009/0260290 A1 | 10/2009 | Mcquaid et al. |

FOREIGN PATENT DOCUMENTS

| | | |
|---|---|---|
| WO | 0297319 | 5/2002 |

* cited by examiner

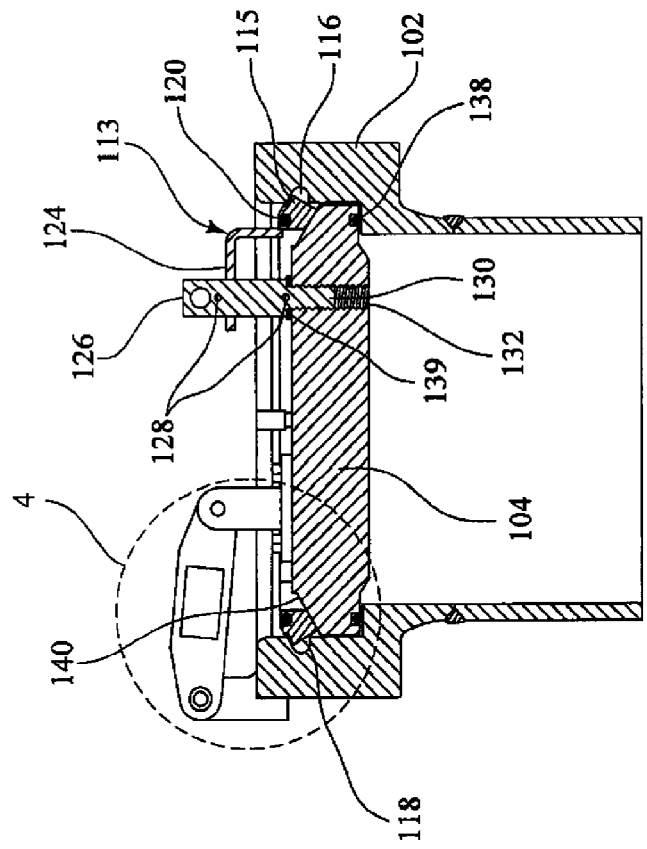
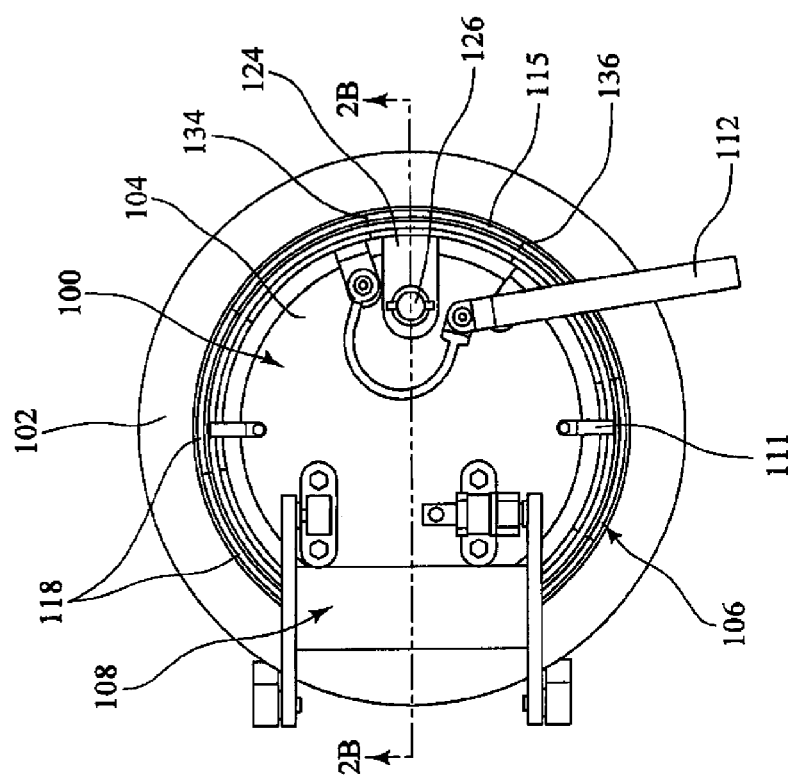
FIG. 2B
FIG. 2A

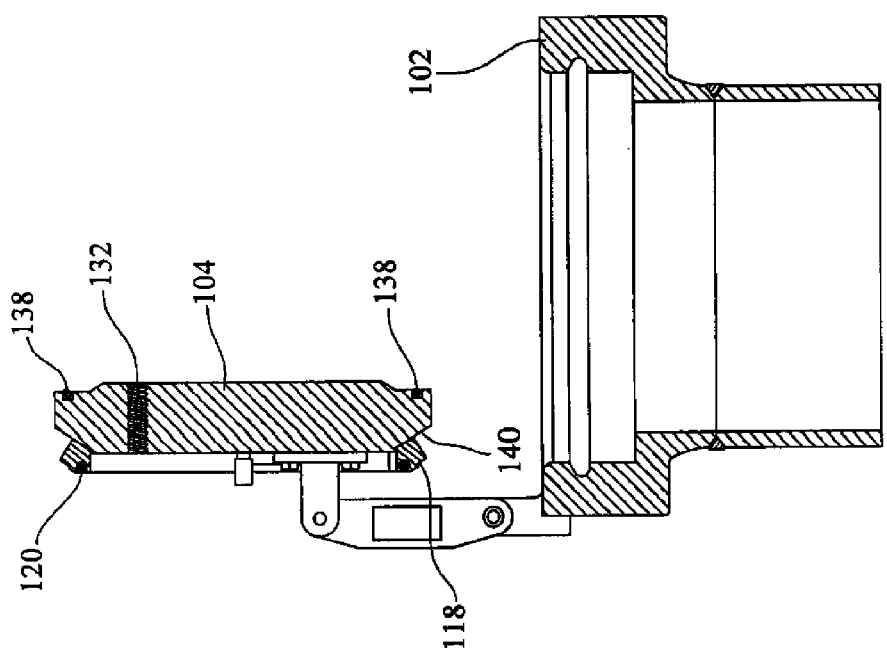
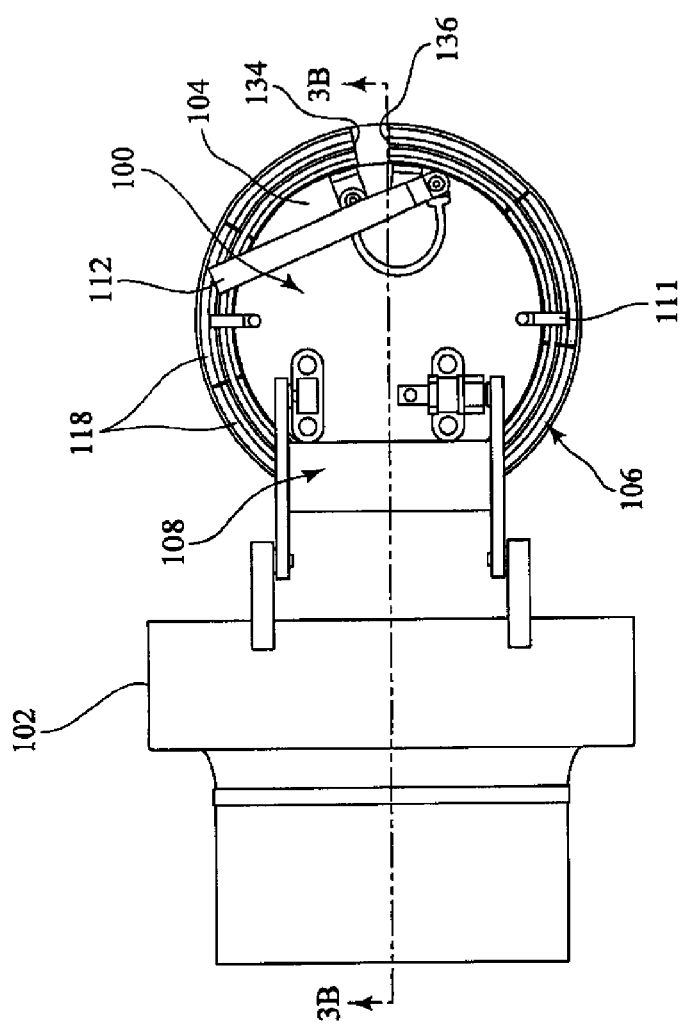
FIG. 3B
FIG. 3A

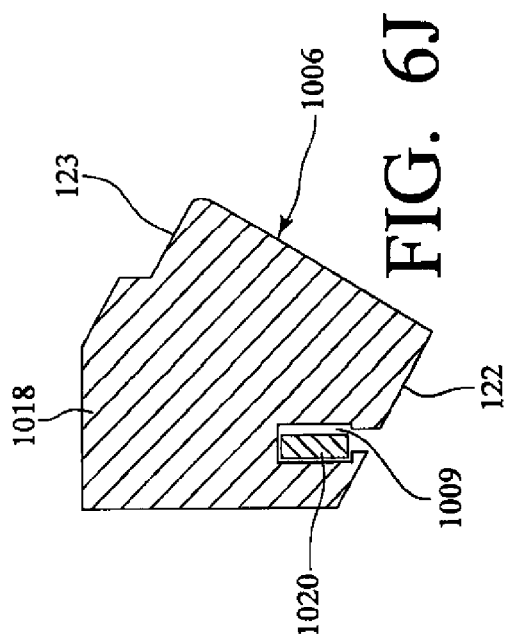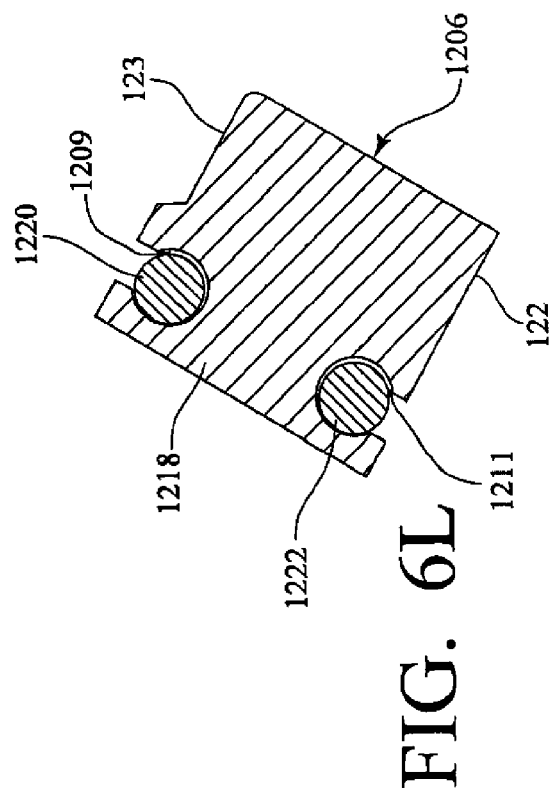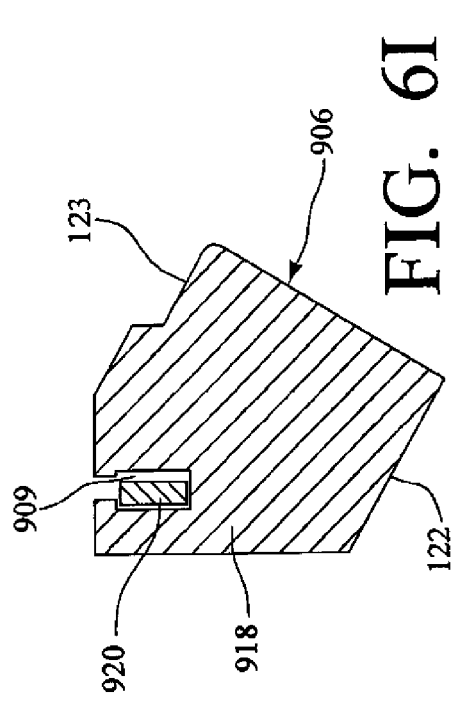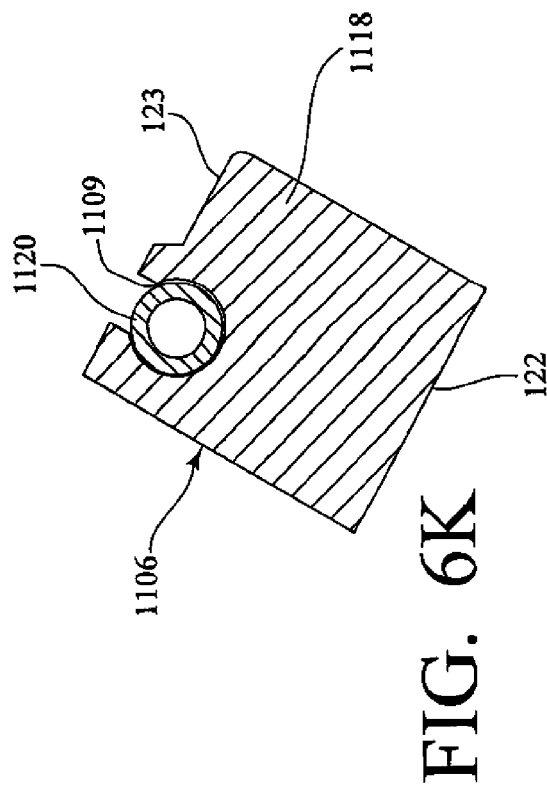

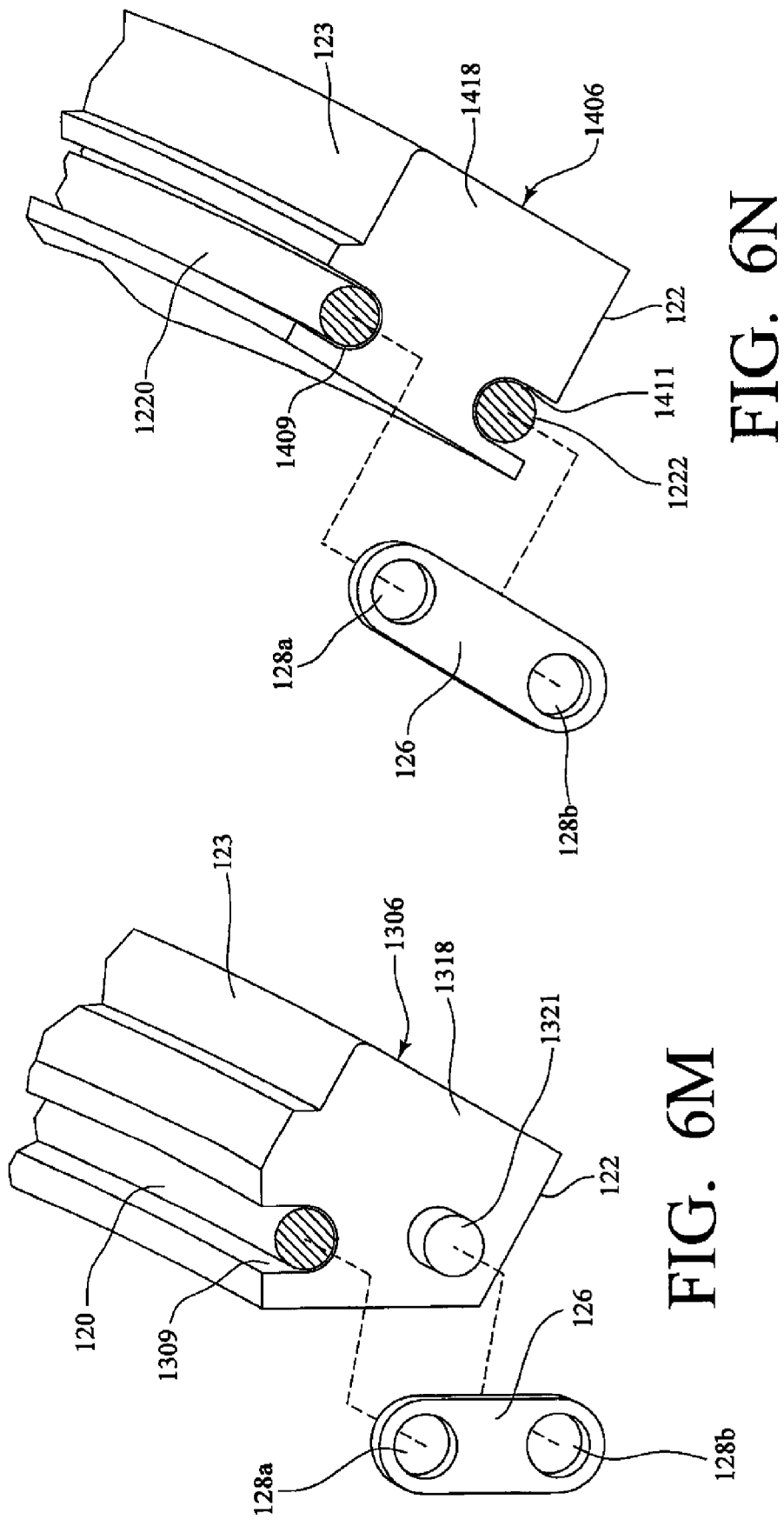

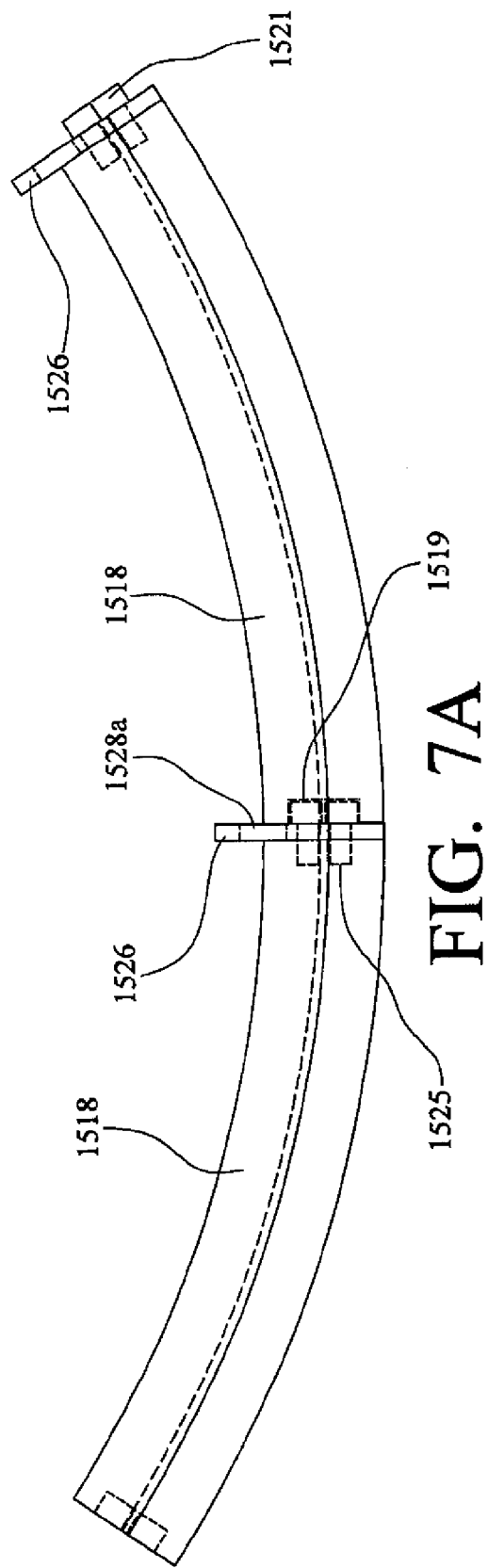
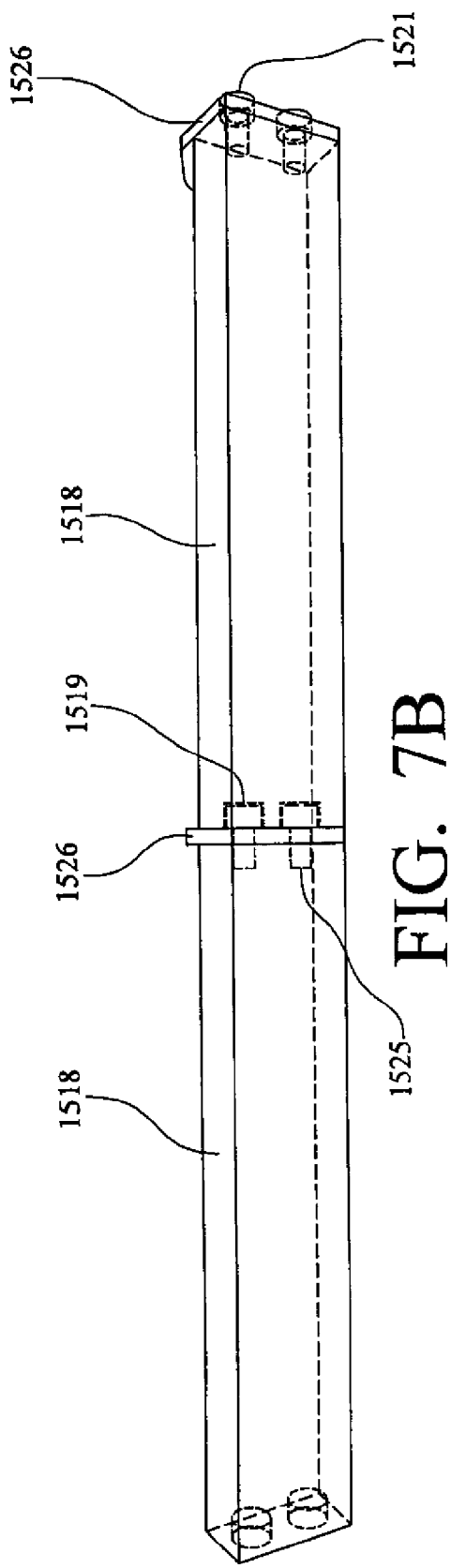

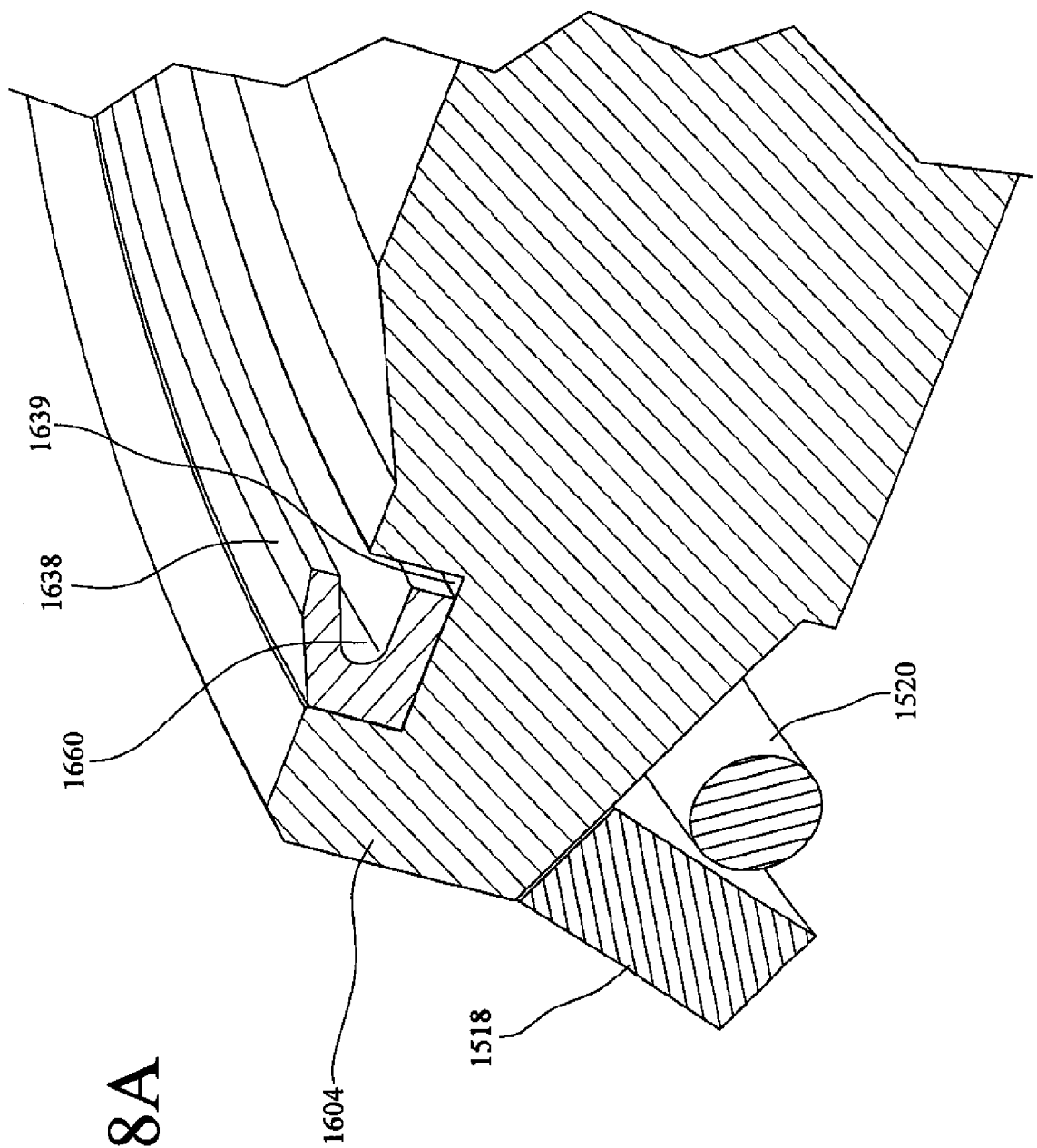

CLOSURE HAVING A SEGMENTED LOCKING RING

CROSS-REFERENCE TO RELATED APPLICATION

This international patent application is a continuation-in-part of and claims priority to and benefit from U.S. Nonprovisional patent application Ser. No. 12/021,886, filed on Jan. 29, 2008, entitled "Closure Having a Segmented Locking Ring", which, under 35 USC §119(e), claims priority to, and benefit from, U.S. Provisional Patent Application Ser. No. 60/976,997, filed on Oct. 2, 2007, entitled "Closure Having a Segmented Locking Ring".

TECHNICAL FIELD

The present invention relates generally to closures for pressure vessels or pipes and more specifically to locking members for pressure closures.

BACKGROUND

Closures for pressure vessels and pipes typically comprise a round door adapted to fit an aperture in the body of the vessel, pipe, or hub extending therefrom. The aperture has an inner circumferential groove for supporting a portion of a locking member. The doors have locking member(s), or portions thereof, proximate a circumferential portion of an outer surface of the door wherein the locking member is engaged to cooperate with the groove about the aperture after the door is closed and seated in the aperture. The locking members of the prior art are typically comprised of a plurality of arms or blocks slidably mounted adjacent the outer periphery of the door and movable from an unlocked position to a locked position. In an unlocked position, the locking member(s) is within the periphery of the outer surface of the door. In a locked position, a part of the locking member(s) protrudes beyond the periphery for engagement with the circumferential groove in the aperture.

Known configurations of locking members include arms or blocks that rotate or extend outwardly, arcuate or "C" shaped rings, slotted as well as segmented, that expand to a locking configuration and contract to an unlocking configuration. Locking member(s) of the prior art have load bearing surfaces that engage an external surface of the annular groove in the hub or vessel and a load bearing surface that engages a portion of the external surface of the door. When the internal surface of the door is subjected to pressure, the resultant force is transferred from the external surface of the door to the external surface of the annular groove about the aperture through the locking member(s) wherein an internal load bearing surface cooperates with the external surface of the door and an external load bearing surface cooperates with the external load bearing surface of the annular groove of the hub.

SUMMARY

A pressure or vacuum closure having a round door with an arcuate locking ring having a plurality of arcuate locking ring segments is provided. The plurality of locking ring segments are connected, end to end, by at least one connecting ring forming the locking ring having an arcuate "C" shaped configuration. The locking ring is movably retained proximate an outer circumference of an external surface of the door with retaining clips. The locking ring is suitable to expand and contract wherein an outer circumferential portion of the locking ring is suitable to engage a groove within an inner circumferential surface of an opening when the locking ring is in an expanded orientation and is suitable to contract to a circumference less than the inner circumference of the opening. When the locking ring is in an expanded locked position, an outer circumferential portion of the locking ring extends beyond the circumference of the door and is received into the groove within the inner annular surface of the pipe, container, vessel, or hub extending therefrom.

The locking ring segments may have at least one cavity extending through the arcuate length thereof with a portion of the connecting ring extending therethrough, retaining the locking ring segments together to form the locking ring. Each cavity has a greater cross-sectional area than the cross-sectional area of the connecting ring extending therethrough. Optionally, the cross-sectional configuration of the connecting ring and cavities through which it extends is rounded. At least one cavity(s) extending through the locking ring segments may have an axial opening extending the arcuate length of each locking ring segment. Axial, as used herein, refers to an orientation with respect to the longitudinal axis of the hub when the door is in a closed position within the hub. The axial opening may have a width less than or greater than the diameter of the locking ring extending therethrough. Optionally, the locking ring segments have protuberances and fitting recesses on adjacent circumferential ends. Furthermore, connecting ring retaining links may be placed between a plurality of adjacent locking ring segments securing the connecting ring(s) into the cavities.

Alternatively, the arcuate locking ring has a plurality of arcuate locking ring segments with a connecting ring retaining link fastened between each arcuate segment and each end face of the arcuate locking ring. In this embodiment, each connecting ring retaining link has a portion extending radially inward from an inner radial surface of the arcuate locking ring. Radial, as used herein, refers to an orientation with respect to the radius of the hub when the door is in a closed position within the hub. The inward extending portion has an aperture therein for receiving the connecting ring. The connecting ring arcuately extends through each aperture in the connecting ring retaining links, thus retaining each locking ring segment together to form the arcuate locking ring.

A pressure retaining closure for a pressurized vessel, comprises a hub, a head having an inner surface and an outer surface and a peripheral edge, the head hingedly connected to the hub, a C-shaped locking ring, having a plurality of segments, disposed along the outer surface of the head in an angled head bearing surface adjacent to the peripheral edge, each of the segments having a polygonal cross-section including a radially inner surface and first and second fastening apertures extending through the radially inner surface of the segments, a C-shaped connecting ring, having a rectangular cross-section, positioned along the radially inner surfaces of the segments, the connecting ring having pairs of fastening apertures aligned with the first and second fastening apertures of each of the segments, wherein the connecting ring is moveable to expand or collapse the locking ring from a first position engaging the hub to a second position disengaging the hub allowing opening and closing of the head. The closure wherein the connecting ring is cylindrical in shape. The closure wherein the polygonal cross-section of each of the segments has five sides. The closure wherein the radially inner surface of each of the segments defines a substantially cylindrical inner surface. The closure wherein the radially outer surface of each of the segments defines a frusto-conical locking ring outer surface. The closure further comprising a locking ring linkage having a first lug connected at a first end of the connecting ring and a second lug connected at a second end of the connecting ring. The closure further comprising a first C-shaped link connected to the first lug and a second link connected to the second lug and said first C-shaped link.

A pressure retaining closure comprises a substantially circular hub having a groove along an inner surface, a substantially circular head pivotally connected to the hub for movement between an open position and a closed position, the head having an outer surface, an inner surface and a peripheral edge, a connecting ring positioned along an outer surface of the head, the connecting ring having fastening apertures, a locking ring defined by a plurality of locking ring segments, each of the segments having first and second fastening apertures corresponding to the fastening apertures of the connecting ring, the connecting ring fastened to the locking ring and wherein the locking ring is expandable by movement of the connecting ring between first and second positions, the first position being radially inward of the groove and allowing opening and closing of the hub, the second position being radially outward of the peripheral edge of the head and further wherein the connecting ring is seated in the groove. The pressure retaining closure further comprising a frusto-conically shaped outer surface on the locking ring. The pressure retaining closure further comprising a substantially cylindrical inner surface on the locking ring. The pressure retaining closure further comprising a substantially cylindrically shaped connecting ring. The pressure retaining closure further comprising a head bearing surface along which the connecting ring moves radially inwardly and outwardly. The pressure retaining closure wherein the head bearing surface is tapered and forces the locking ring outward toward a locked position during pressurization. The pressure retaining closure further comprising an interlocking segment connected to a pressure warning device, the interlocking segment disposed between ends of the locking ring.

A pressure retaining closure, comprises a hub having a round opening and a peripheral groove, a head pivotally connected to the hub, a locking ring defined by a plurality of arcuate segments of polygonal cross-section and having pairs fastening apertures, the locking ring being movable between a first disengaged position and a second engaged position wherein the locking ring is at least partially disposed in the groove, a connecting ring having a plurality fastening apertures corresponding to the pairs fastening apertures of the arcuate segments, the connecting ring fastened to the locking ring along a radially inward surface of the locking ring, the locking ring having a substantially frusto-conically shaped outer surface and a substantially cylindrically inner surface for receiving the cylindrically shaped connecting ring. The pressure retaining closure wherein each of the plurality of segments have two angled surfaces which engage the hub. The pressure retaining closure wherein each of the plurality of segments further comprising an angled surface which slides along an angled bearing surface of the head.

A pressure warning device for a closure comprises a hub for attachment to a pressure vessel, a head hingedly attached to the hub, a pressure warning device connected to an outer surface of the head, a linkage for expanding a locking ring between a first collapsed position to a second expanded position, the linkage having at least one link which engages the pressure warning device during movement of the linkage inhibiting collapse of the locking ring. The pressure warning device further comprises an interlock segment connected to the pressure warning device for positioning between first and second ends of the locking ring. The pressure warning device of claim 18 wherein the pressure warning device is positioned adjacent the linkage after the locking ring is expanded. The pressure warning device wherein the pressure warning device is removed from the head before the locking ring is collapsed. The pressure warning device wherein the pressure warning device is a locking device.

A pressure warning device for use with a closure, comprises a hub having an opening therein, a head hingedly attached to the hub and closing the opening of the hub, a pressure release opening in the head in fluid communication with the hub when the head is in a closed position within the hub, a locking ring connected to a linkage, the linkage moving the locking ring between an expanded position engaging the hub and a collapsed position disengaging the hub, a pressure warning device positioned in the pressure release opening and interfering with a travel path of the linkage to inhibit collapse of the locking ring before the pressure warning device is removed. The pressure warning device further comprising an interlock segment connected to the pressure warning device. The pressure warning device further comprising an arm connected to the pressure warning device and the interlock segment. The pressure warning device wherein the pressure warning device is positioned adjacent the linkage after the locking ring is expanded. The pressure warning device wherein the pressure warning device is removed from the head before the locking ring is collapse. The pressure warning device wherein the pressure warning device having an axially extending groove allowing release of pressurized air.

A pressure warning device for use with a closure, comprises a hub having a hollow interior, a head pivotally connected to the hub, a flow through aperture in the head allowing flow communication with the hollow interior when the head is pivotally closed, a locking ring for locking the head within the hub, the locking ring movable from a collapsed unlocked position, to an expanded locked position, a pressure warning device disposed in the flow through aperture of the head; a locking ring linkage positioned on an outer surface of the head adjacent the flow through aperture, the linkage engaging the pressure warning device when the linkage moves the locking ring from the expanded locked position to a collapsed unlocked position. The pressure warning device further comprising a pressure release groove. The pressure warning device wherein the pressure warning device interferes with a path of the linkage. The pressure warning device wherein the pressure warning device being a locking device inhibiting collapse of the linkage. The pressure warning device further comprising a connecting ring connected to the locking ring. The pressure waning device wherein the locking ring linkage has a first lug connected to one end of the connecting ring and a second lug connected to the second end of the connecting ring. The pressure warning device wherein the locking ring linkage further comprises a first link pivotally connected to the first lug and a second link pivotally connected to the second lug, and the first and second links pivotally connected to each other. The pressure warning device further comprising posts extending from the head and engaging the first lug to constrain motion of the first lug.

BRIEF DESCRIPTION OF THE ILLUSTRATIONS

In order that the invention may be better understood, embodiments of the closure in accordance with the present invention will now be described by way of examples. These embodiments are not to limit the scope of the present invention as other embodiments of the closure of the present invention will become apparent to one having ordinary skill in the art upon reading the instant description. Examples of the present invention are shown in figures wherein:

FIG. 2A is a frontal view of the closure of FIG. 1 in a closed representation showing the orientation of a locking ring and actuator assembly with respect to a door in a closed position within a hub;

FIG. 2B is a cross-sectional view of the closure of FIG. 2A showing the orientation of the locking ring segment, connecting ring, hinge assembly, safety system assembly, and sealing gasket with respect to a door and a hub;

FIG. 3A is a side view of the closure of FIG. 1 in an open representation showing the orientation of a locking ring and actuator assembly with respect to a door and a hub;

FIG. 3B is a cross-sectional view of the closure of FIG. 3A showing the orientation of the locking ring in a retracted, open orientation about a door;

FIGS. 6A-6L are cross-sectional views of several embodiments of a locking ring showing configurations of locking ring segments of the locking ring having cavities cooperating with at least one connecting ring and the cooperation there between;

FIGS. 6M and 6N are cut-away views of several embodiments of a locking ring showing configurations of locking ring segments of the locking ring, connecting rings, connecting ring retaining links, and cooperation there between;

FIGS. 7A and 7B are top and side views, respectively, of the locking ring of FIG. 7 showing the engagement and cooperation of the connecting ring retaining links and fasteners with the locking ring segments;

FIGS. 8A through 8G show embodiments of sealing gaskets that may be seated within a circumferential groove about an inner surface of a door;

DETAILED DESCRIPTION

Figure 1:
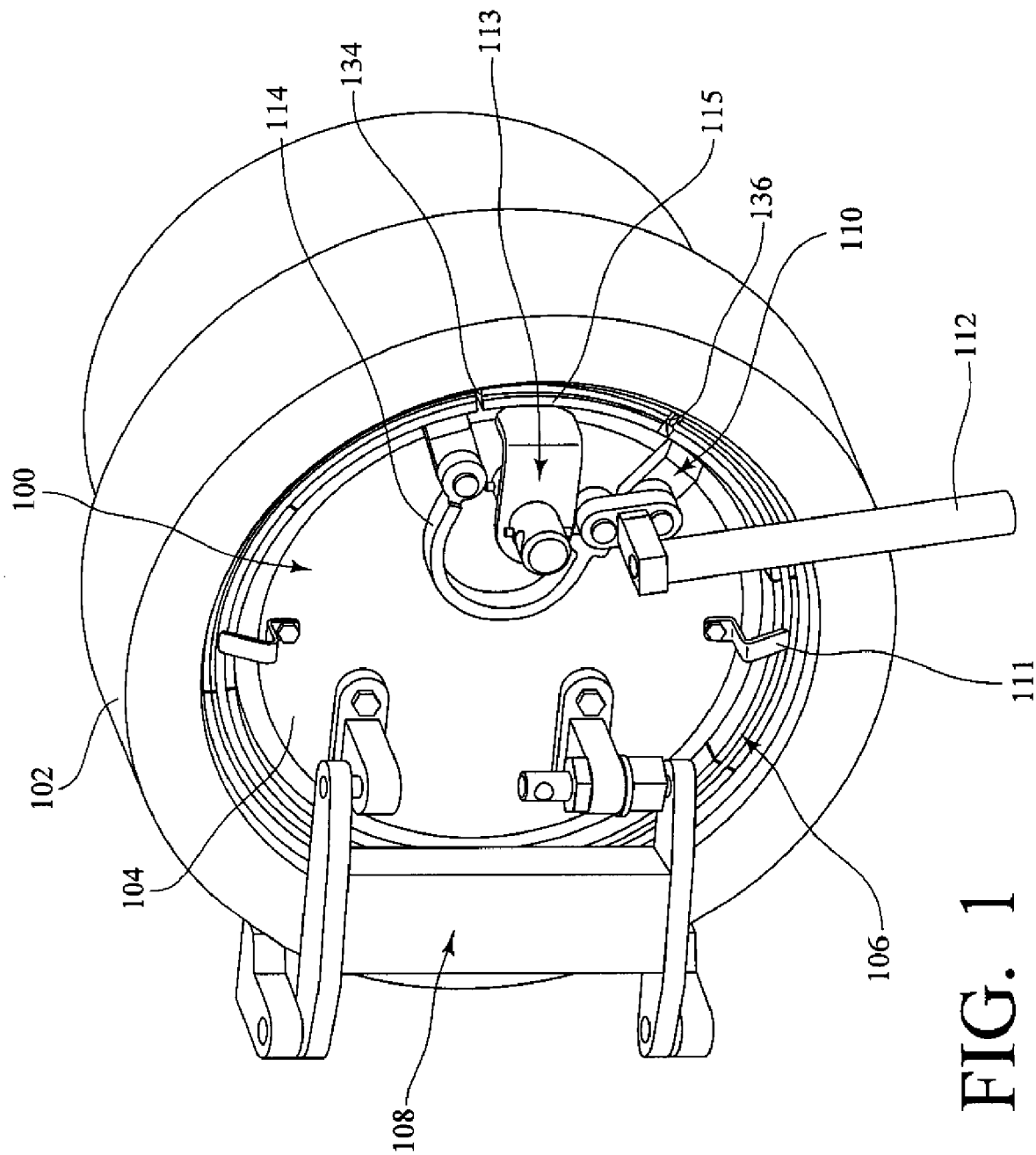
FIG. 1 is a perspective view of an embodiment of a closure in a closed representation showing a door within a hub and components thereof on an outer surface of the door.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

FIG. 1 is a perspective view of closure 100 in a closed representation. Closure 100 comprises door 104 hingedly attached to the outermost annular surface of hub 102 with hinge assembly 108 and seated within an inner annular surface of hub 102. In this closed orientation, segmented locking ring 106 is expanded having a portion visible about an external surface of door 104 and a portion within groove 116 (shown in FIG. 2b) in an inner annular surface of hub 102. Also shown here is locking ring actuator assembly 110 comprising crank lever 112 rotatingly engaging crank spring 114 and locking ring 106 via weldment. In this locked position, crank lever 112 has been rotated clockwise from an unlocked position wherein crank spring 114 applies a separating force proximate one end of locking ring 106 and crank lever 112 applies a separating force proximate the other end of locking ring 106 expanding locking ring 106. Between the end faces 134 and 136 of locking ring 106 is locking segment 115 supported therein with locking segment assembly 113. Locking segment 115 has a portion in the inner annular groove 116 in hub 102 between the end faces 134 and 136 of locking ring 106 which prevents the contraction of locking ring 106 when in an expanded locked position. Clips 111 moveably hold locking ring 106 proximate the outer circumferential edge of the outer surface of door 104 allowing locking ring 106 to expand into and contract out of groove 116 in hub 102.

FIGS. 2a and 2b show door 104 in a closed orientation within hub 102. Door 104 has outwardly tapered outer load bearing surface 140 proximate the inner annular surface of hub 102 which cooperates with axially inward facing load bearing surface 122 (shown in FIG. 4) of locking ring 106. Hub 102 has inner annular groove 116 proximate the outer circumferential surface of door 104. The axially inward facing load bearing surface of inner annular groove 116 cooperates with axially outward facing load bearing surface 123 (shown in FIG. 4) of locking ring 106. Locking ring 106 is shown as a plurality of locking ring segments 118 retained together with connecting ring 120. Locking ring 106 comprising a plurality of locking ring segments 118 and connecting ring 120 may have a plurality of configurations forming an expandable locking ring 106 with axially inward and outward facing load bearing surfaces 122 and 123 (shown in FIG. 4).

Also shown in FIGS. 2a and 2b is safety locking segment assembly 113 having locking segment 115. Locking segment assembly 113 comprises pressure warning screw 126 having threaded end 130 that cooperates with threaded aperture 132 in door 104. Aperture 132 is in flow communication with the wetted internal portion of hub 102 and ambient air when pressure warning screw 126 is removed. About an outer annular surface of pressure warning screw 126 is "L" shaped locking segment connecting bracket 124 which has an aperture in one leg about an outer portion of pressure warning screw 126. Pins 128 extend through apertures in pressure warning screw 126 and cooperate within each side of bracket 124 so that when pressure warning screw 126 is removed, the assembly remains inseparable. When pressure warning screw 126 is threaded into aperture 132, as shown, locking segment connecting bracket 124 which is adjacent or connected to an inner radial surface of locking segment 115 constrains locking segment 115 between end faces 134 and 136 of locking ring 106. In this locked position, locking ring 106 is prohibited from contracting and keeping a portion of locking ring 106 within groove 116. Loosening pressure warning screw 126 releases locking segment 115 so that it may be removed from hub 102. When in the locked position, as shown here, locking segment 115 cooperates with each end, 134 and 136, of locking ring 106 retaining it in an expanded locked orientation within inner annular groove 116. Advantageously, at least one of the threads within the inner annular surface of aperture 132 or on the outer annular surface of threaded end 130 of pressure warning screw 126 has a groove therein or other configuration allowing an amount of pressurized gasses within hub 102 to escape making a whistling sound or other warning sound about gasket 139 when pressure warning screw 126 is loosened.

Sealing gasket 138 is shown within a circumferential groove about an inner surface of door 104 proximate an outer circumference. Sealing gasket 138 may be of any configuration as is known in the art which imparts a seal between an inner surface of door 104 and hub 102. For example, seal 138 may be an o-ring seal, an energized seal comprised of a single piece or a plurality of pieces including an anti-extrusion ring thereabout, or have other configurations as is known in the art. For example, seal 138 may be fluid or spring energized. Seal 138 may be extruded or molded and may have an anti-extrusion ring about an outer circumferential surface.

FIGS. 3a and 3b show door 104 in an open orientation hingedly attached to hub 102 with hinge assembly 108. Closure 100 has locking segment assembly 113 removed therefrom wherein a gap is formed between each end face 134 and 136 of locking ring 106. End faces 134 and 136 are then drawn together in the gap created with the removal of locking segment 115 (shown in FIG. 2A). Door 104 has locking ring 106 contracted to an inner portion of outwardly tapered outer load bearing surface 140 and removed from groove 116.

Figure 4:
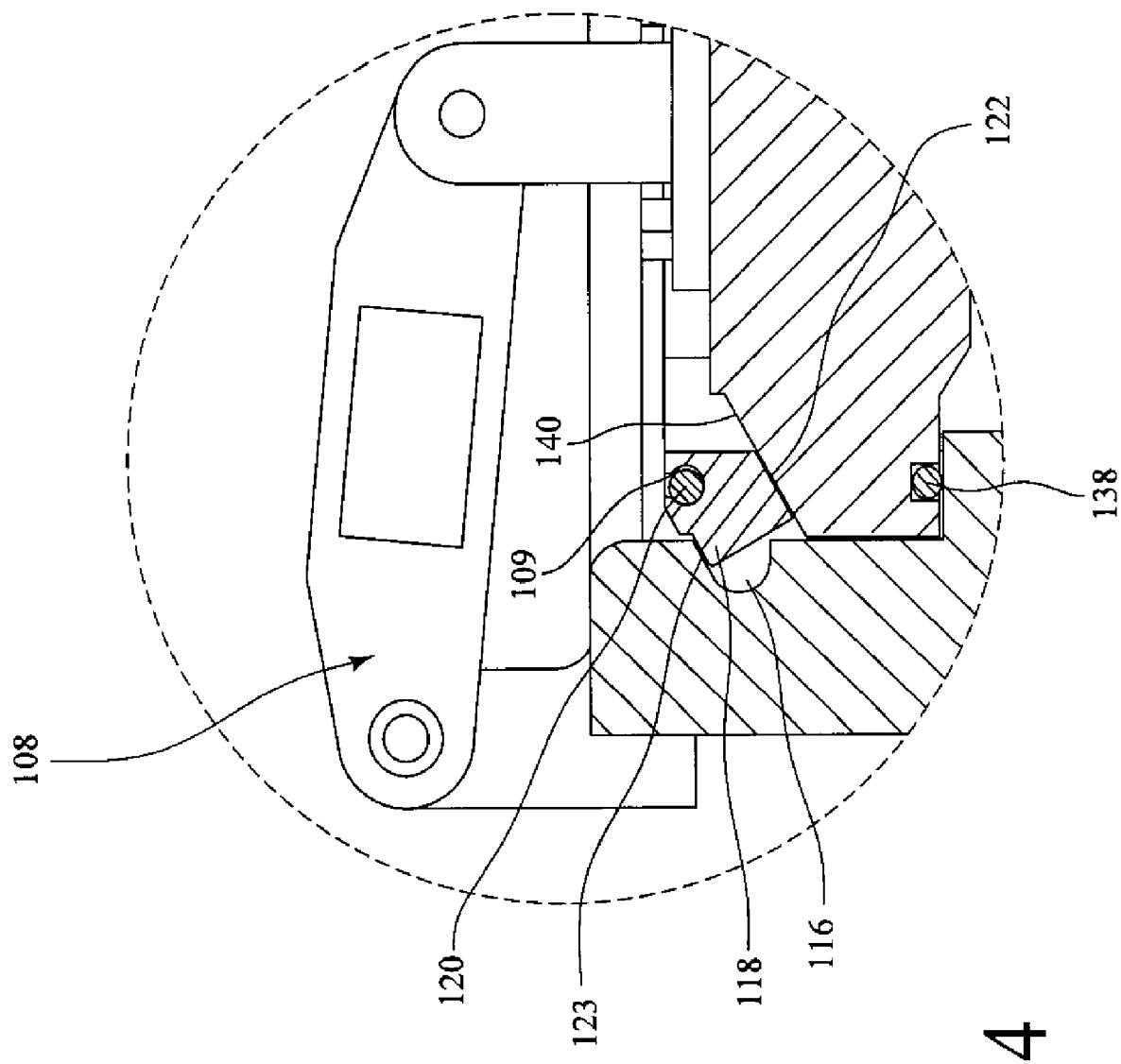
FIG. 4 is a cross-sectional cut-away view of the closure of FIG. 2B showing the cooperation of the locking ring segment and a sealing gasket with the hub.

FIG. 4 shows the cooperation between segmented locking ring 106 with a load bearing portion in annular groove 116 in the inner annular surface of hub 102. Locking ring segment 118 has axially inward and outward facing load bearing surfaces 122 and 123. Inward facing load bearing surface 122 cooperates with outwardly tapered outer load bearing surface 140 of door 104. Outward facing load bearing surface 123 cooperates with an axially inward facing load bearing surface of inner annular groove 116. This configuration transfers the pressure applied to the inner surface of door 104 to locking ring 106 and inner annular groove 116.

Figure 5:
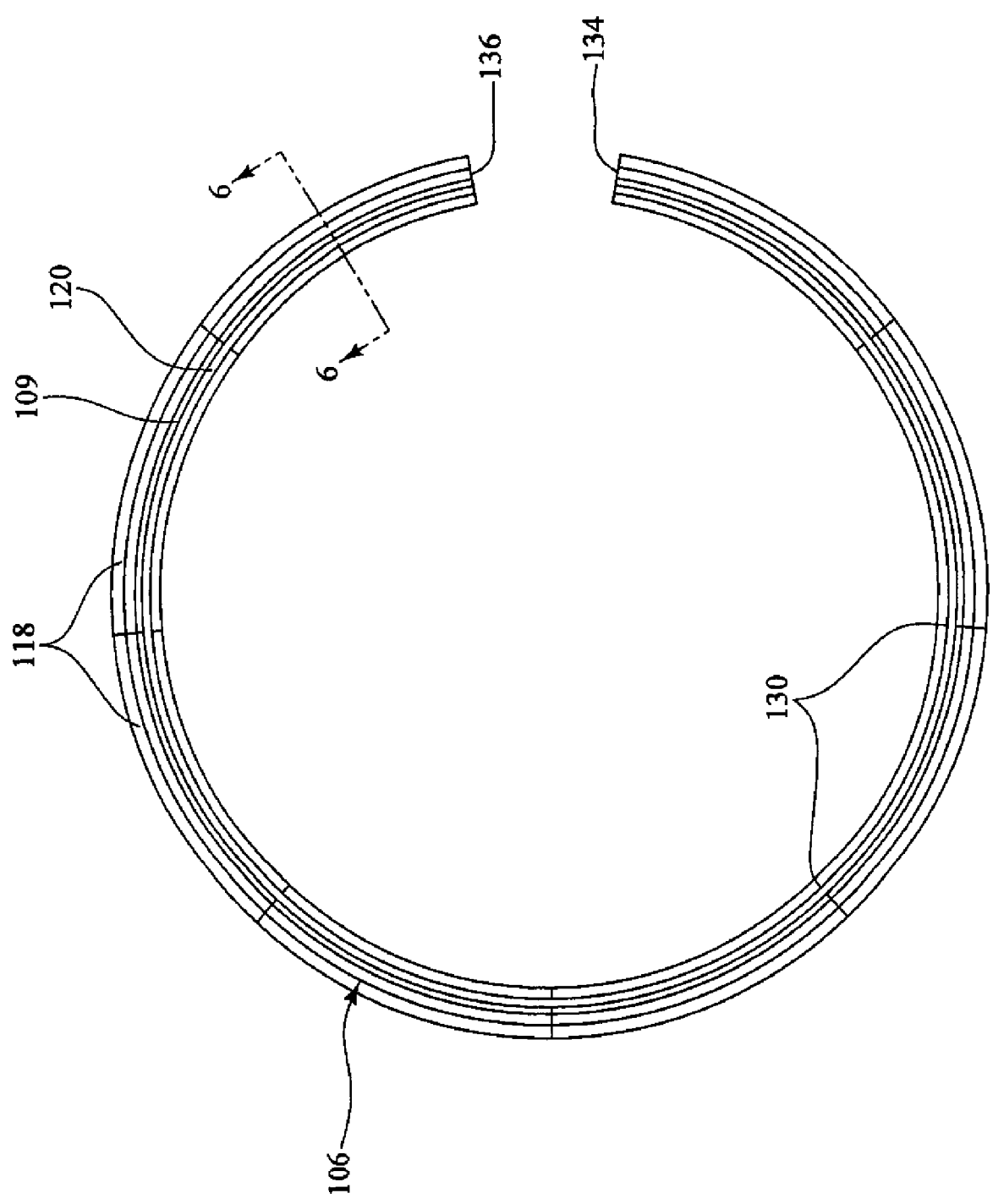
FIG. 5 is a frontal view of the locking ring of FIG. 1 showing locking ring segments of an expanded locking ring and an expansion gap between end faces of the locking ring.

FIG. 5 shows a front view of segmented locking ring 106 having connecting ring 120. Locking ring 106 has a plurality of locking ring segments 118 retained together with connecting ring 120 forming arcuate or "C" shaped segmented locking ring 106. Locking ring 106 has end faces 134 and 136 movable towards and away from each other allowing radial expansion and contraction of the locking ring 106. Connecting ring 120 resides within an arcuate cavity within each locking ring segment 118 and is comprised of a flexible material, such as spring steel, suitable for expanding and contracting locking ring 106.

Figure 6A:
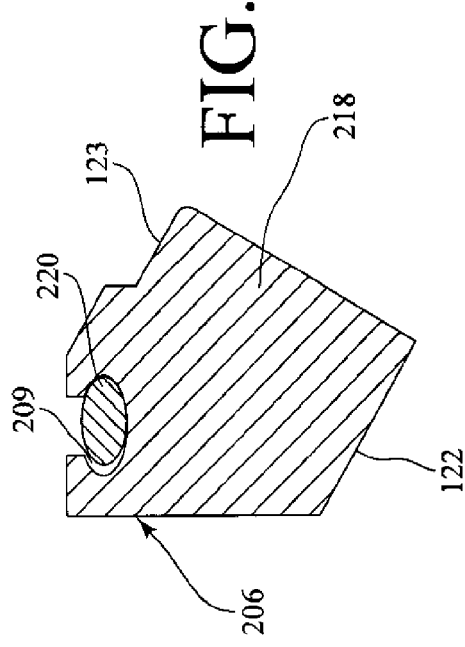

FIGS. 6A-6L show several embodiments of a locking ring and associated connecting ring(s). FIG. 6A shows locking ring 106 having connecting ring 120 within arcuate cavity 109. Connecting ring 120 is comprised of a flexible material having a round cross-section suitable for retaining locking ring segments 118 together and suitable for enabling locking ring 106 to radially expand and contract into an open and closed orientation. In a closed orientation, locking ring 106 is expanded wherein an outer circumferential portion is suitable to engage a groove within an inner circumferential surface of an opening. In an open orientation, locking ring 106 is contracted to a circumference less than the inner circumference of the outer portion of the opening. Arcuate cavity 109 has an axially outward opening in locking ring 106 and a larger diameter than that of connecting ring 120 forming a space between an inner surface of locking ring segment 118 and connecting ring 120 providing room for connecting ring 120 to radially expand and contract without placing excessive force on an internal surface of locking ring segment 118. Arcuate cavity 109 shows an axially outward opening in locking ring 106. This axial opening is optional as it is formed during an advantageous method of removing material from an internal portion of locking ring segment 118 forming arcuate cavity 109 and is not critical to the present invention as other methods of manufacture known in the art may produce arcuate cavity 109 within ring segment 118 without an opening in an outer surface of ring segment 118.

Locking ring 106 has axially inward and outward facing load bearing surfaces 122 and 123 being frustoconical surfaces to slidingly engage load bearing surface 140 of hub 102 and a load bearing surface within groove 116 in hub 102. Load bearing surfaces 122 and 123 are shown as being substantially parallel and form an angle α with respect to the central axis of locking ring 106. Advantageously, angle α is between about 85° and 0° and more advantageously at least 30°. Even though in the embodiments shown, load bearing surfaces 122 and 123 are shown as being substantially parallel, it is to be understood that load bearing surfaces 122 and 123 may be divergent. Having divergent load bearing surfaces 122 and 123 forms a wedge shaped cross-section within locking ring 106. This wedge configuration causes an expanding force to be placed on locking ring 106 when an outward force is exerted by load bearing surface 140 of door 104 forcing load bearing surface 123 against the load bearing surface within groove 116 in hub 102.

Figure 6B:
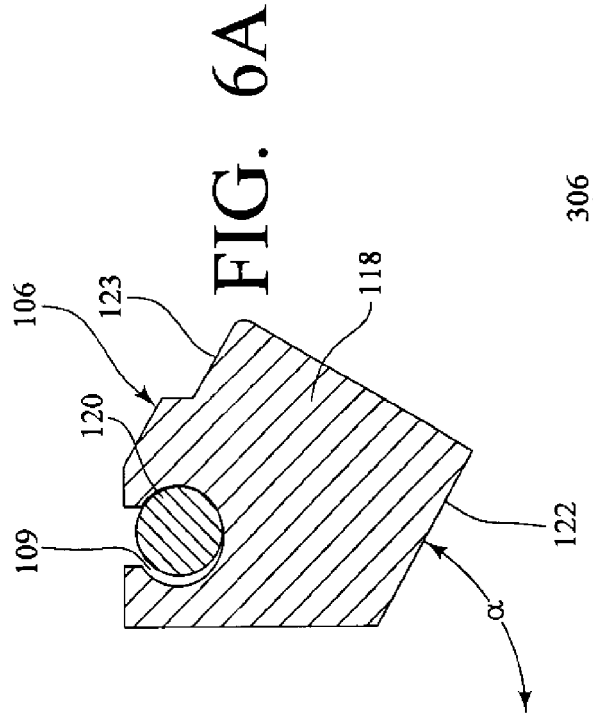

FIG. 6B shows locking ring 206 having connecting ring 220 within arcuate cavity 209 in locking ring segment 218. Connecting ring 220 has a horizontal oval shaped cross-section suitable for retaining locking ring segments 218 together and suitable for enabling locking ring 206 to radially expand and contract into an open and closed orientation. Arcuate cavity 209 also has a horizontal oval configuration and has an axially outward opening in locking ring 206. Arcuate cavity 209 has a larger diameter than that of connecting ring 220 forming a space between an inner surface of locking ring segment 218 and connecting ring 220 providing room for connecting ring 220 to radially expand and contract without placing excessive force on an internal surface of locking ring segment 218. Locking ring 206 has axially inward and outward facing load bearing surfaces 122 and 123.

Figure 6C:
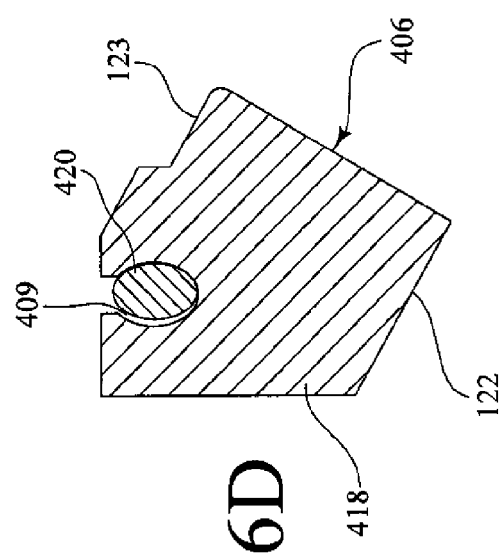

FIG. 6C shows locking ring 306 having connecting ring 120 within arcuate cavity 309 in locking ring segment 318.

Connecting ring 120 has a round cross-section suitable for retaining locking ring segments 318 together and suitable for enabling locking ring 306 to radially expand and contract into an open and closed orientation. Arcuate cavity 309 also has a round configuration and has an axially inward opening in locking ring 306. Arcuate cavity 309 has a larger diameter than that of connecting ring 120 forming a space between an inner surface of locking ring segment 318 and connecting ring 120 providing room for connecting ring 120 to radially expand and contract without placing excessive force on an internal surface of locking ring segment 318. Locking ring 306 has axially inward and outward facing load bearing surfaces 122 and 123.

Figure 6D:
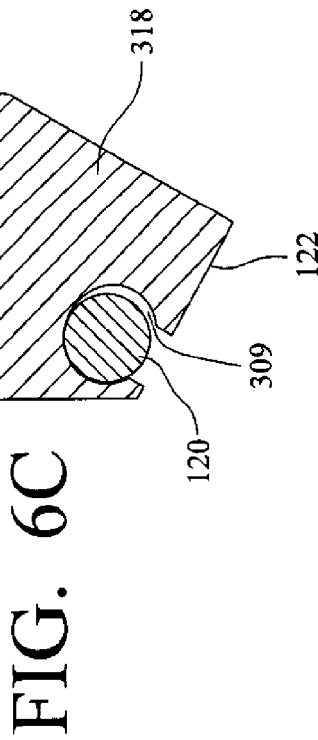

FIG. 6D shows locking ring 406 having connecting ring 420 within arcuate cavity 409 in locking ring segment 418. Connecting ring 420 has a vertical oval shape cross-section suitable for retaining locking ring segments 418 together and suitable for enabling locking ring 406 to radially expand and contract into an open and closed orientation. Arcuate cavity 409 also has a vertical oval configuration and has an axially outward opening in locking ring 406. Arcuate cavity 409 has a larger diameter than that of connecting ring 420 forming a space between an inner surface of locking ring segment 418 and connecting ring 420.

Figure 6E:
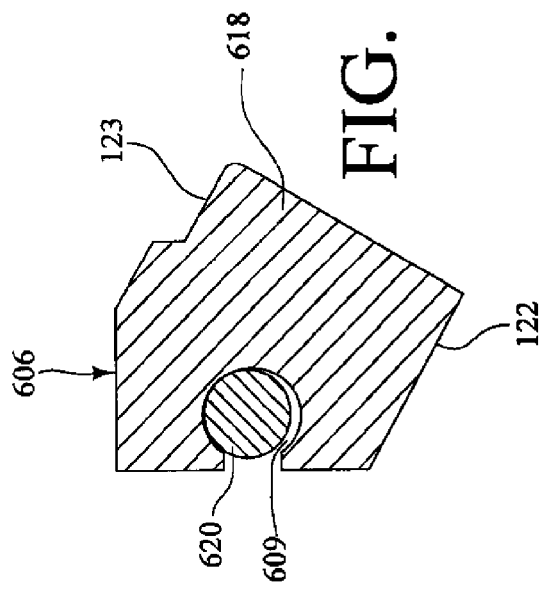

FIG. 6E shows locking ring 506 having connecting rings 120 within arcuate cavities 109 and 509 in locking ring segment 518. Connecting rings 120 have a round cross-section for retaining locking ring segments 518 together and are suitable for enabling locking ring 506 to radially expand and contract into an open and closed orientation. Arcuate cavity 109 has a round configuration and has an axially outward opening in locking ring 506. Arcuate cavity 509 has a round configuration and has an axially inward opening in locking ring 506. Arcuate cavities 109 and 509 have larger diameters than that of connecting rings 120 forming a space between an inner surface of locking ring segment 518 and connecting rings 120.

Figure 6F:
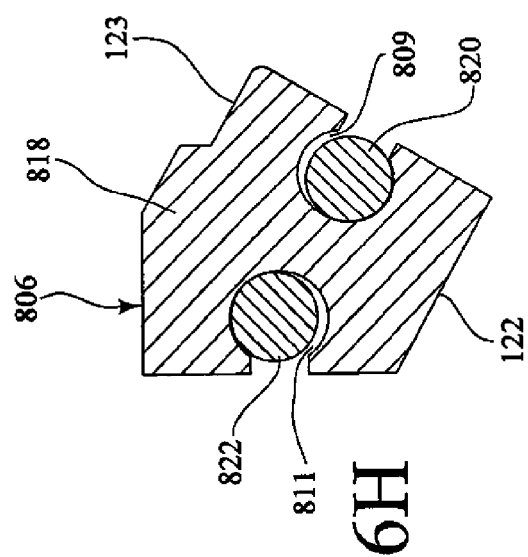

FIG. 6F shows locking ring 606 having connecting ring 620 within arcuate cavity 609 in locking ring segment 618. Connecting ring 620 has a round cross-section suitable for retaining locking ring segments 618 together and suitable for enabling locking ring 606 to radially expand and contract into an open and closed orientation. Arcuate cavity 609 also has a round configuration and has a radially inward opening in locking ring 606. Arcuate cavity 609 has a larger diameter than that of connecting ring 620 forming a space between an inner surface of locking ring segment 618 and connecting ring 620.

Figure 6G:
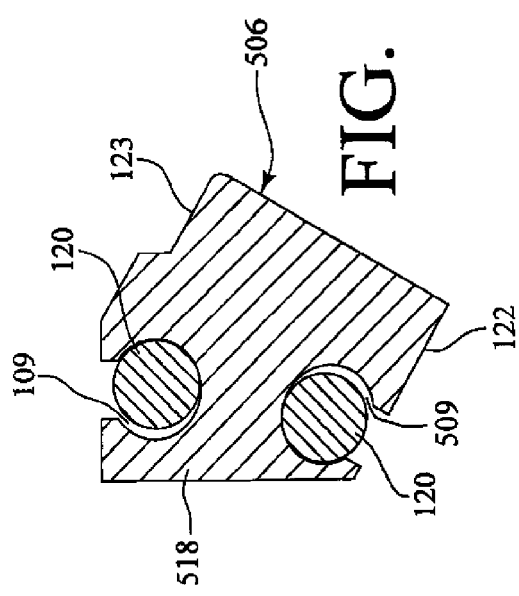

FIG. 6G shows locking ring 706 having connecting ring 720 within arcuate cavity 709 in locking ring segment 718. Connecting ring 720 has a round cross-section suitable for retaining locking ring segments 718 together and suitable for enabling locking ring 706 to radially expand and contract into an open and closed orientation. Arcuate cavity 709 also has a round configuration and has a radially outward opening in locking ring 706. Arcuate cavity 709 has a larger diameter than that of connecting ring 720 forming a space between an inner surface of locking ring segment 718 and connecting ring 720.

Figure 6H:
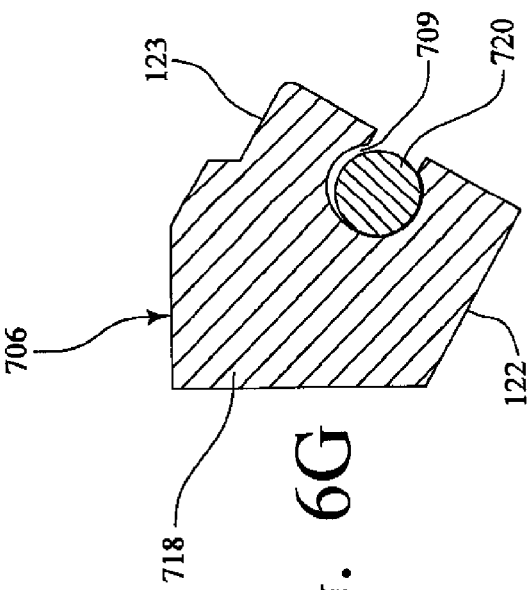

FIG. 6H shows locking ring 806 having connecting rings 820 and 822 within arcuate cavities 809 and 811 in locking ring segment 818. Connecting rings 820 and 822 have a round cross-section for retaining locking ring segments 818 together and are suitable for enabling locking ring 806 to radially expand and contract into an open and closed orientation. Arcuate cavity 809 has a round configuration and has a radially outward opening in locking ring 806. Arcuate cavity 811 has a round configuration and has a radially inward opening in locking ring 806. Arcuate cavities 809 and 811 have larger diameters than that of connecting rings 820 and 822 forming a space between an inner surface of locking ring segment 818 and connecting rings 820 and 822.

FIG. 6I shows locking ring 906 having connecting ring 920 within arcuate cavity 909 in locking ring segment 918. Connecting ring 920 has a rectangular cross-section suitable for retaining locking ring segments 918 together and suitable for enabling locking ring 906 to radially expand and contract into an open and closed orientation. Arcuate cavity 909 also has a rectangular configuration and has a radially outward opening in locking ring 906. Arcuate cavity 909 has a larger cross-sectional area than that of connecting ring 920 forming a space between an inner surface of locking ring segment 918 and connecting ring 920.

FIG. 6J shows locking ring 1006 having connecting ring 1020 within arcuate cavity 1009 in locking ring segment 1018. Connecting ring 1020 has a rectangular cross-section suitable for retaining locking ring segments 1018 together and suitable for enabling locking ring 1006 to radially expand and contract into an open and closed orientation. Arcuate cavity 1009 also has a rectangular configuration and has an axially inward opening in locking ring 1006. Arcuate cavity 1009 has a larger cross-sectional area than that of connecting ring 1020 forming a space between an inner surface of locking ring segment 1018 and connecting ring 1020.

FIG. 6K shows locking ring 1106 having connecting ring 1120 within arcuate cavity 1109 in locking ring segment 1118. Connecting ring 1120 has a rounded cross-section with a hollow center suitable for retaining locking ring segments 1118 together and suitable for enabling locking ring 1106 to radially expand and contract into an open and closed orientation. Arcuate cavity 1109 also has a round configuration and has an axially outward opening in locking ring 1106. Arcuate cavity 1109 has a larger diameter than that of connecting ring 1120 forming a space between an inner surface of locking ring segment 1118 and connecting ring 1120. Locking ring segment 1118 has a substantially rectangular configuration with load bearing surfaces 122 and 123 and shows that the cross-sectional configuration of the locking ring of the present invention may have most any cross-sectional configuration.

FIG. 6L shows locking ring 1206 having connecting rings 1220 and 1222 within arcuate cavities 1209 and 1211 in locking ring segment 1218. Connecting rings 1220 and 1222 have a round cross-section for retaining locking ring segments 1218 together and are suitable for enabling locking ring 1206 to radially expand and contract into an open and closed orientation. Arcuate cavity 1209 has a round configuration and has an axially outward opening in locking ring 1206. Arcuate cavity 1211 has a round configuration and has an axially inward opening in locking ring 1206. Arcuate cavities 1209 and 1211 have larger diameters than that of connecting rings 1220 and 1222 forming a space between an inner surface of locking ring segment 1218 and connecting rings 1220 and 1222.

FIG. 6M shows locking ring 1306 having connecting ring 120 within arcuate cavity 1309. Connecting ring 120 is comprised of a flexible material having a round cross-section suitable for retaining locking ring segments 1318 together and suitable for enabling locking ring 1306 to radially expand and contract into an open and closed orientation. It is to be understood that connecting ring 120 may have any cross-sectional configuration such as oval, rectangular, or even triangular. In a closed orientation, locking ring 1306 is expanded wherein an outer circumferential portion is suitable to engage a groove within an inner circumferential surface of an opening. In an open orientation, locking ring 1306 is contracted to a circumference less than the inner circumference of the outer portion of the opening exterior of the groove. Arcuate cavity 1309 has an axially outward opening in locking ring 1306 and a larger diameter than that of connecting ring 120 forming a space between an inner surface of locking ring segment 1318 and connecting ring 120 providing room for connecting ring 120 to radially expand and contract without placing excessive force on an internal surface of locking ring segment 1318. Arcuate cavity 1309 has an axially outward opening in locking ring 1306 with a width proximate the diameter of cavity 1309. This axial opening configuration permits more cost effective tooling of locking ring segment 1318 in making cavity 1309 at specified tolerances. Protuberance 1321 extends from one circumferential end of locking ring segment 1318 and engages a like shaped recess on the other circumferential end of an adjacent locking ring segment 1318 (not shown). Connecting ring retaining link 126 has aperture 128b suitable to receive protuberance 1321 and aperture 128a suitable to receive connecting ring 120. A connecting ring retaining link 126 is placed between a plurality of locking ring segments 1318 in locking ring 1306 about locking ring 120 and protuberances 1321 retaining connecting ring 120 within cavity 1309.

FIG. 6N shows locking ring 1406 having connecting rings 1220 and 1222 within arcuate cavities 1409 and 1411 in locking ring segment 1418. Connecting rings 1220 and 1222 have round cross-sections for retaining locking ring segments 1418 together and are suitable for enabling locking ring 1406 to radially expand and contract into an open and closed orientation. Arcuate cavities 1409 and 1411 have round configurations and have axially outward and inward openings, respectively, in locking ring 1406. Arcuate cavities 1409 and 1411 have diameters greater than that of connecting rings 1220 and 1222 forming a space between an inner surface of locking ring segment 1418 and connecting rings 1220 and 1222. Arcuate cavities 1409 and 1411 have axially outward and inward openings, respectively, in locking ring 1406 with a width proximate the diameter of cavities 1409 and 1411 respectively. These axial openings permit more cost effective tooling of locking ring segment 1418 in making cavities 1409 and 1411 at specified tolerances. Connecting ring retaining link 126 has aperture 128b suitable to receive connecting ring 1222 and aperture 128a suitable to receive connecting ring 1220. A connecting ring retaining link 126 is placed between a plurality of adjacent locking ring segment 1418 in locking ring 1406 about locking rings 1220 and 1222 retaining connecting rings 1220 and 1222 within cavities 1409 and 1411 respectively. Advantageously, a connecting ring retaining link 126 is placed between each adjacent locking ring segment 1418. It is to be understood that apertures 128a and 128b may be joined to form a single aperture wherein connecting ring retaining link 126 and still be within the scope of the present invention.

Figure 7:
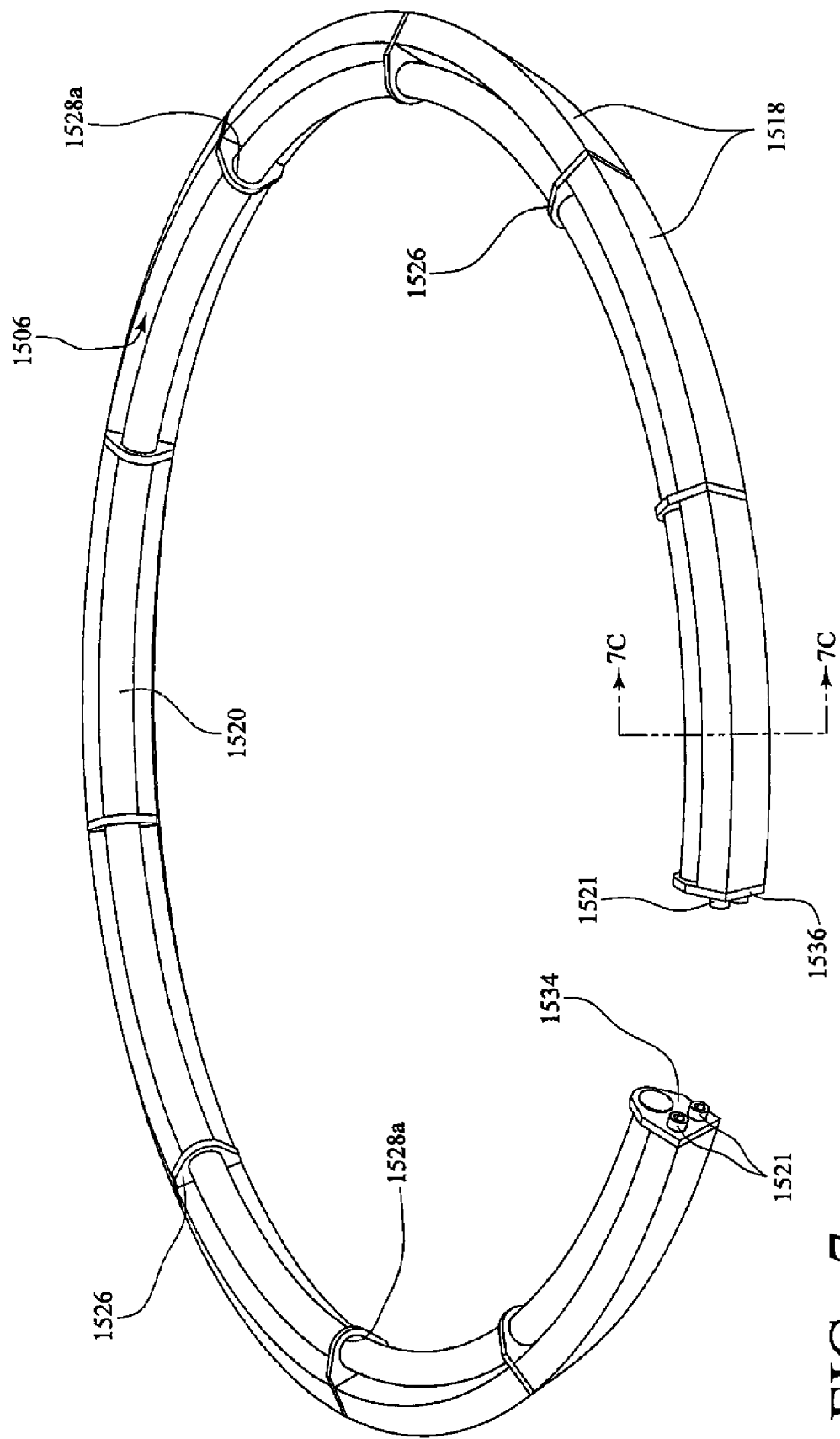
FIG. 7 is a perspective view of a locking ring showing locking ring segments cooperating with a connecting ring about an inner radial surface thereof with a plurality of connecting ring retaining links.

FIG. 7 shows a perspective view of segmented locking ring 1506 having connecting ring 1520. Locking ring 1506 has a plurality of solid locking ring segments 1518 retained together with connecting ring 1520 forming arcuate or "C" shaped segmented locking ring 1506. Connecting ring 1520 is comprised of a flexible material, such as spring steel, suitable for expanding and contracting locking ring 1506. Locking ring 1506 is shown in an expanded closed orientation having end faces 1534 and 1536 gap spaced. Fasteners 1521 hold connecting ring retaining links 1526 between each locking ring segment 1518 and to each end face 1534 and 1536. Retaining links 1526 have aperture 1528a suitable to receive connecting ring 1520.

FIGS. 7A and 7B are top and side views, respectively, showing fasteners 1521 fastened to one locking ring segment 1518 in a cavity 1525 and having a head extending into a cavity 1519 in an adjacent locking ring segment 1518. Fasteners 1521 extend through apertures 1528b, shown in FIG. 7D, fastening connecting ring retaining links 1526 between each locking ring segment 1518 and to each end face 1534 and 1536. The head of each fastener 1521, between each locking ring segment 1518, resides within a cavity 1519 within each locking ring segment 1518. Cavity 1519 has a larger diameter than the head of fastener 1521 so that when locking ring segments 1518 flex or contract in a radial direction; fasteners 1521 do not damage locking ring segments 1518.

Figure 7D:
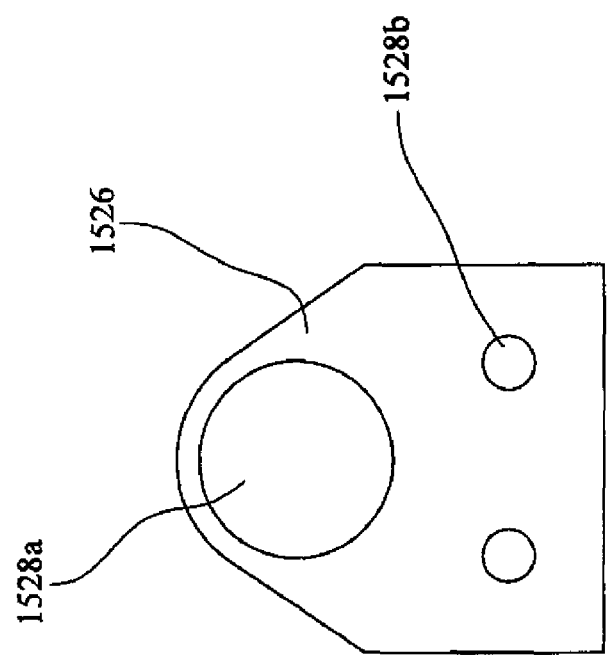
FIG. 7D is a front view of a connecting ring retaining link of FIG. 7.
Figure 7C:
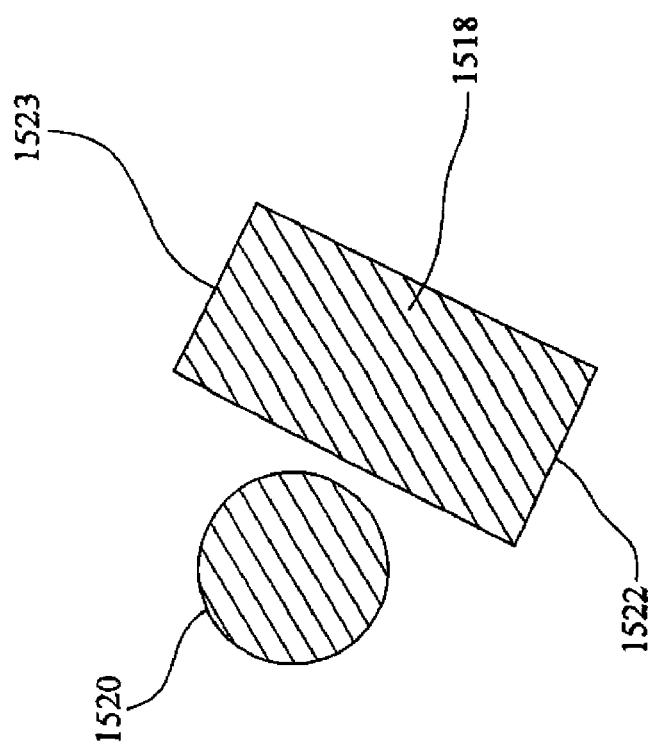
FIG. 7C is a cross-sectional view of a locking ring segment and connecting ring of the locking ring of FIG. 7 showing the orientation between the connecting ring and locking ring.

FIG. 7C is a cross-sectional view of a solid locking ring segment 1518 and connecting ring 1520 showing the orientation therebetween. Connecting ring 1520 has a round cross-sectional configuration and is spaced from the inner circumferential surface of locking ring segment 1518 so that connecting ring 1520 does not interfere with locking ring segments 1518 when locking ring 1506 is in an expanded closing configuration. Locking ring segments 1518 have a rectangular configuration with load bearing surfaces 1522 and 1523 on axial sides thereof.

FIG. 7D shows a front view of a connecting ring retaining link 1526. Connecting ring retaining link 1526 has a rectangular lower portion for engaging ends of locking ring segments 1518 and being fastened thereto. Apertures 1528b are suitable for extending fasteners 1521 therethrough. The top portion of connecting ring retaining link 1526 has aperture 1528a suitable for receiving connecting ring 1520.

Figure 8B:
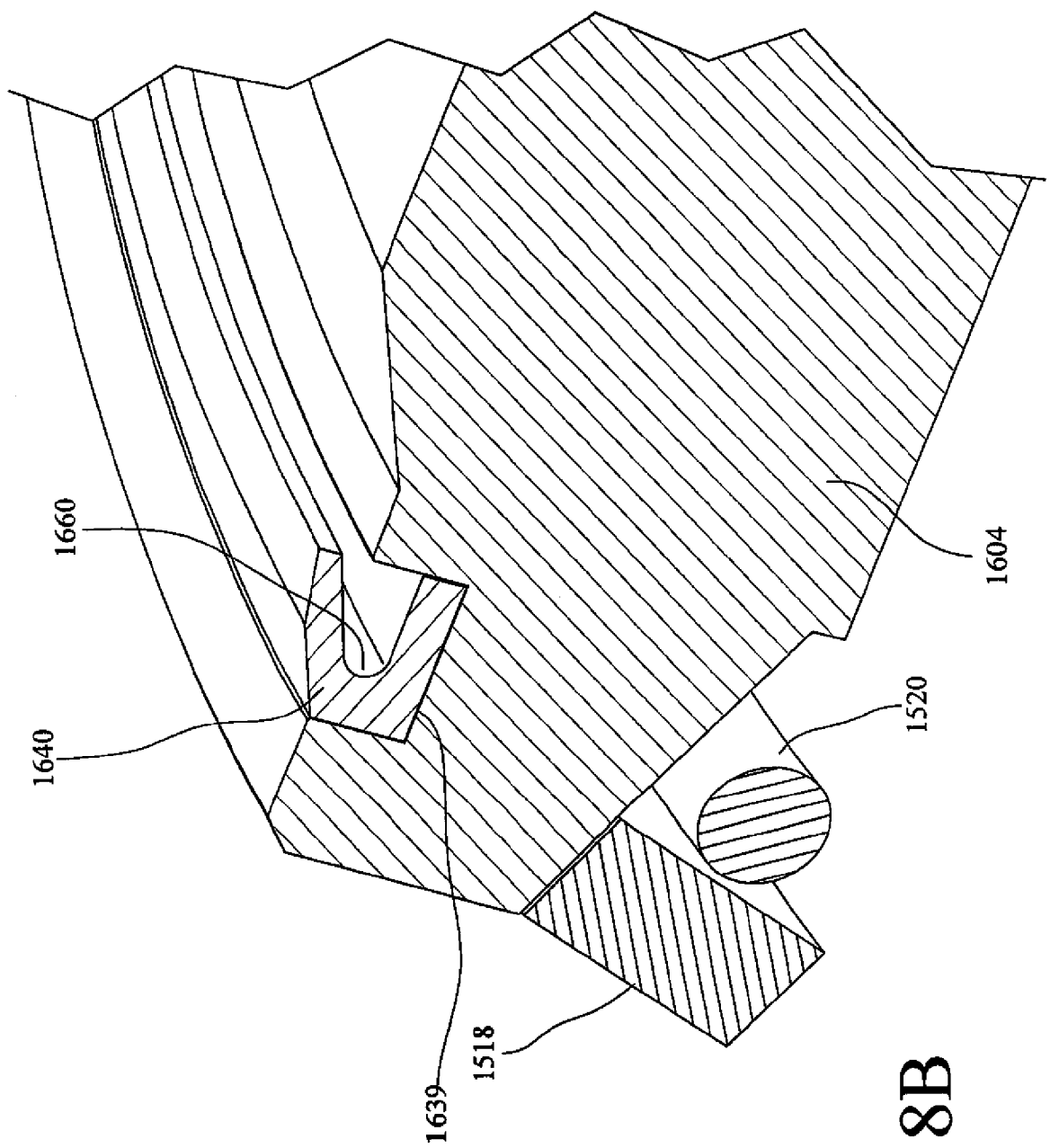

FIGS. 8A through 8G show alternative embodiments of sealing gaskets. Sealing gasket 1638 shown in FIG. 8A is within circumferential groove 1639 about an inner surface of door 1604 proximate an outer circumference thereof. Locking ring segment 1518 and connecting ring 1520 are shown cooperating with an outer surface of door 1604. Sealing gasket 1638 imparts a seal between the inner surface of door 1604 and a hub. In this embodiment, seal 1638 is a fluid energized seal having a smaller inner radius than groove 1639. The outer radius of seal 1638 is proximate the outer radius of groove 1639 so that seal 1638 is retained within groove 1639 when door 1604 is opened. Seal 1640, shown in FIG. 8B, has an inner and outer radius proximate the inner and outer radius of groove 1639. Both seals, 1638 and 1640, are fluid energized seals having a rectangular outer portion for seating in groove 1639 and an upper portion with a radially inward facing groove. The radially inward facing groove provides the fluid energized characteristic to the seals.

Figure 8D:
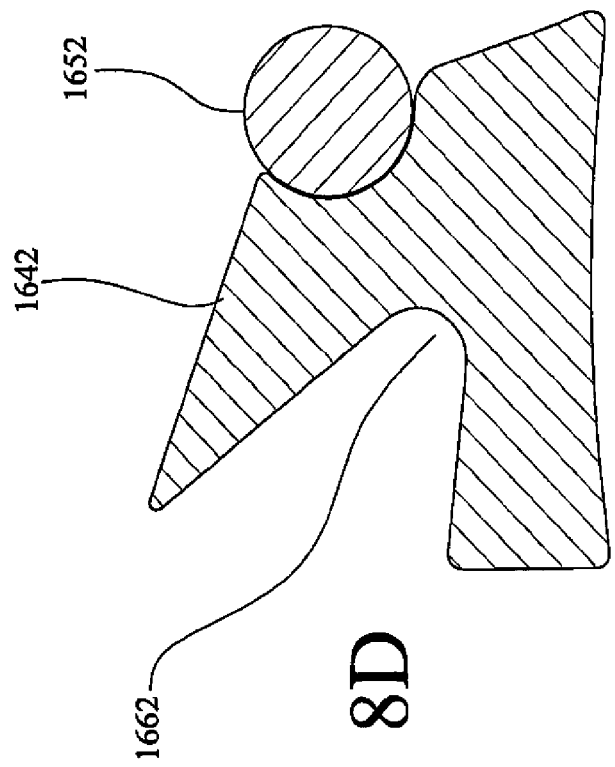
Figure 8C:
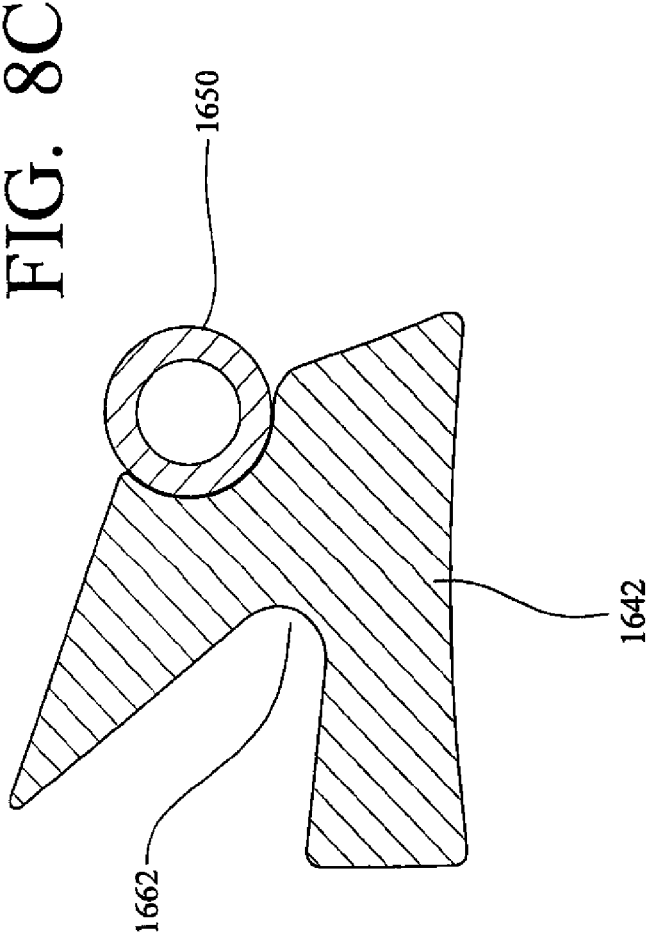

FIGS. 8C and 8D show fluid energized seals having an anti-extrusion ring. Seal 1642 has a portion for seating into a circumferential groove about an inner surface of a door. Sealing gasket 1642 imparts a seal between the inner surface of a door and a hub. In these embodiments, seals 1642 are fluid energized seals having an upper portion with radially inward facing groove 1662. Radially inward facing groove 1662 provides the fluid energized characteristic seal 1642 wherein pressure acting on groove 1662 forces seal 1642 against a door and a hub in cooperation therewith. Seal 1642 is shown having anti-extrusion ring 1650, in FIG. 8C, about an outer circumferential surface preventing seal 1642 from being extruded between the door and hub when pressure is applied at groove 1662. Anti-extrusion 1650 is a hollow ring which may be comprised of polymeric or metallic materials. For example, anti-extrusion ring 1650 may have nylon or polytetrafluoroethylene or may be comprised of a metallic spring. Seal 1642 is shown having anti-extrusion ring 1652, in FIG. 8D, about an outer circumferential surface thereof. Anti-extrusion ring 1652 has a solid ring like structure and may have a molded or extruded polymeric material or may have a metallic material. Anti-extrusion rings 1650 and 1652 may be coextruded or molded with seal 1642 or they may be structurally separate from molded or extruded seal 1642.

Figure 8F:
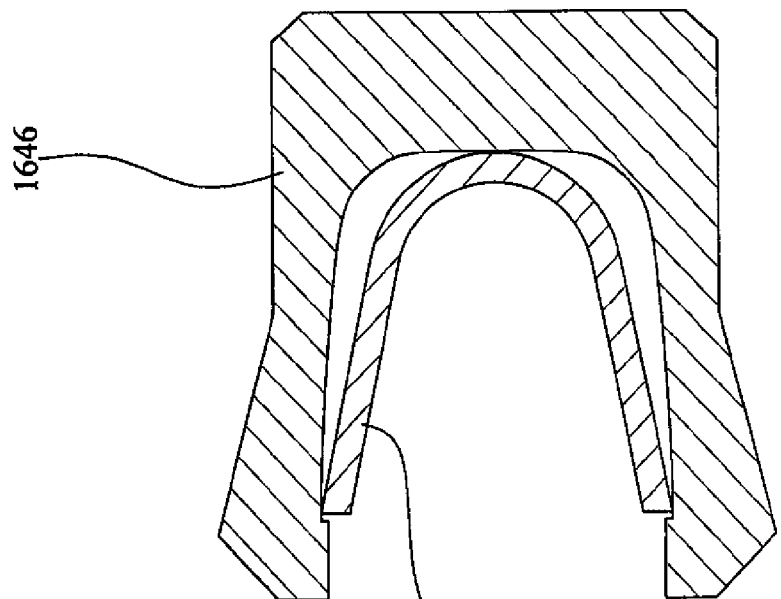
Figure 8E:
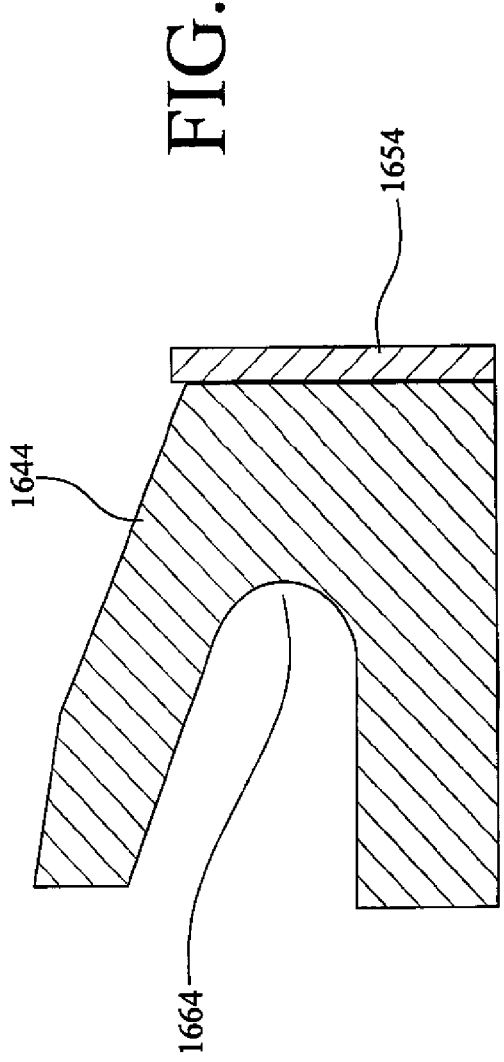

FIG. 8E shows fluid energized seal 1644 having anti-extrusion ring 1654. Anti-extrusion ring 1654 may be structurally separate from seal 1644 or anti-extrusion ring 1654 may coextruded or molded with seal 1644. Seal 1644 has a rectangular portion for seating into a circumferential groove about an inner surface of a door. Radially inward facing groove 1664 provides the fluid energized characteristic seal 1644 wherein pressure acting on groove 1664 forces seal 1644 against a door, a hub, and anti-extrusion ring 1654. Anti-extrusion ring 1654 has a band like configuration where a portion of anti-extrusion ring 1654 fits into the circumferential groove about the door. Anti-extrusion ring 1654 may be comprised of polymeric or metallic materials.

Figure 8G:
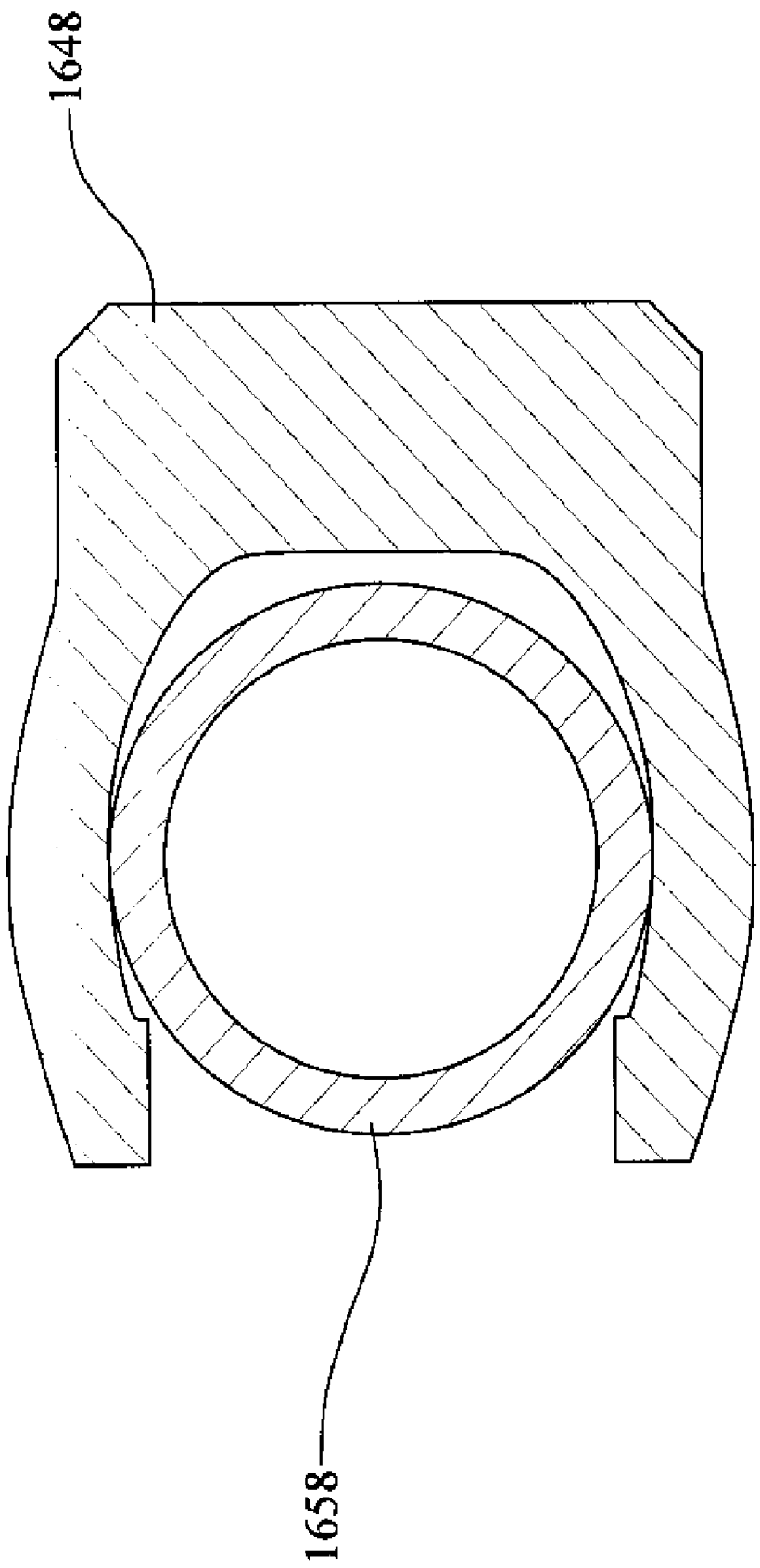

FIGS. 8F and 8G show spring energized seals 1646 and 1648 respectively. Spring 1656 is a cantilever spring which serves to energize seal 1646 by providing an expanding force to a portion thereof as shown. Cantilever spring 1656 may be comprised of a metallic material or polymeric material such as polytetrafluoroethylene. Spring 1658 serves to energize seal 1648 by providing an expanding force to a portion thereof as shown. Spring 1658 may be a helical wound metallic spring or have an annular ring configuration. Advantageously, an annular ring configured spring 1658 is comprised of an elastic polymeric material.

Figure 9:
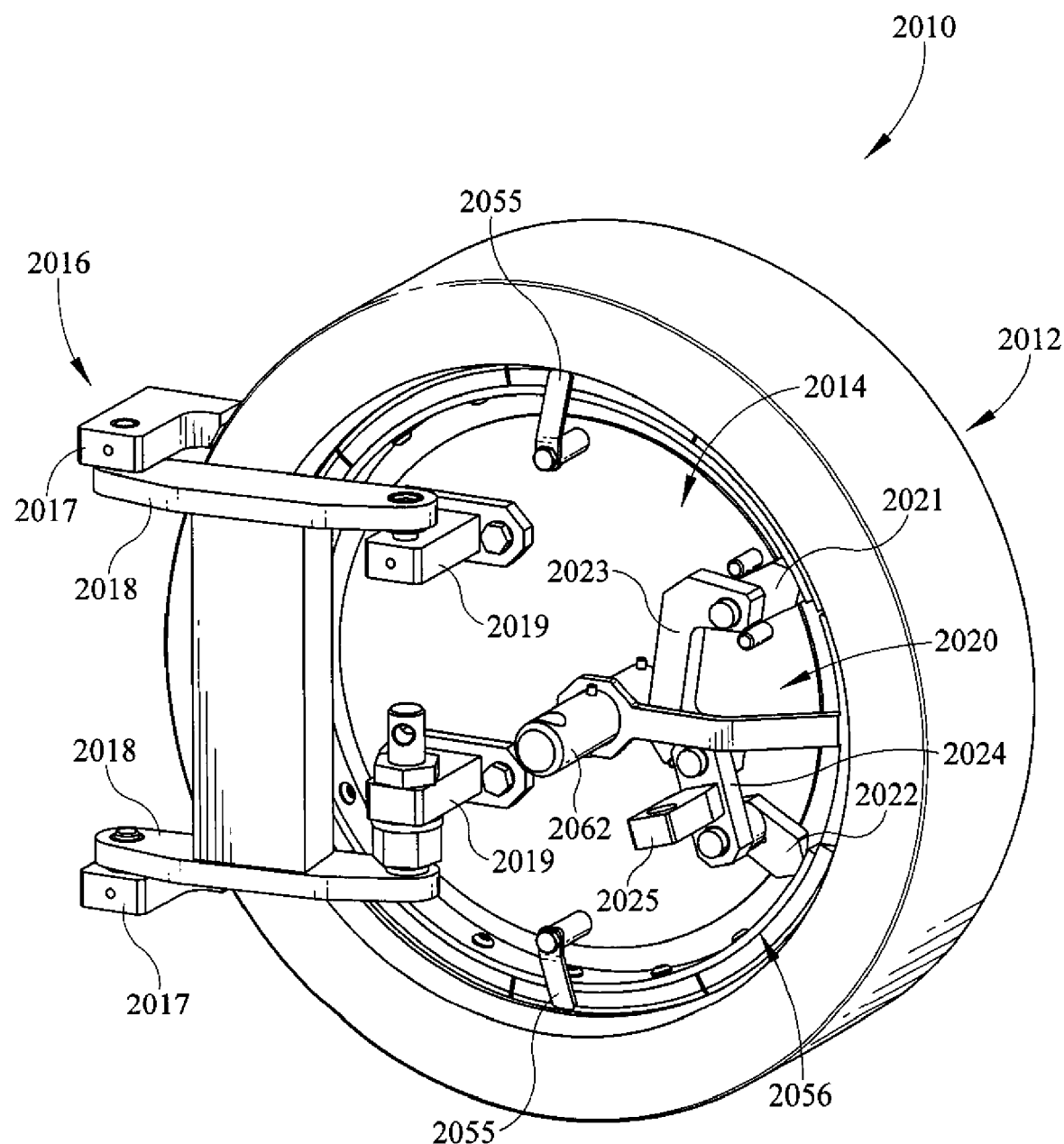
FIG. 9 is a perspective view of an alternative embodiment of the locking ring assembly.

Referring now to FIG. 9, an alternative closure 2010 is depicted. The closure is defined by a hub 2012 and a head or door 2014. The head 2014 is connected to the hub 2012 by a hinge mechanism 2016 which allows the head 2014 to pivot between an open position, allowing access to a pipe or pressure vessel, and a closed position wherein the pipe or vessel may be pressurized.

The hinge mechanism 2016 comprises pairs of first hinge arms 2017 which extend from the hub 2012. At ends of the arms 2017 distal from the hub 2012 are pivotal connections between the first hinge arm 2017 and pairs of second hinge arms 2018. The pairs of hinge arms 2018 may be connected by a crossbar in order to move the pivoting elements together in a more uniformed fashion. At ends of the pairs of hinge arms 2018, distal from the first hinge arms 2017 are pivotal connections with third hinge arms 2019. The hinge arms 2019 extend from the outer surface of the head 2014 to the pivoting connection with the second hinge arms 2018. Thus, the hinge mechanism 2016 comprises a double pivoting construction wherein one pivot motion occurs between the first hinge arms and second hinge arms 2017, 2018, and the second pivoting motion occurs between the second hinge arms and the third hinge arms 2018, 2019. The exemplary device may be used regardless of how the door is pivotally supported for movement between open and closed positions. Alternative mounting arrangements for opening of the door including counterweights and spring assisted hinges.

Figure 11:
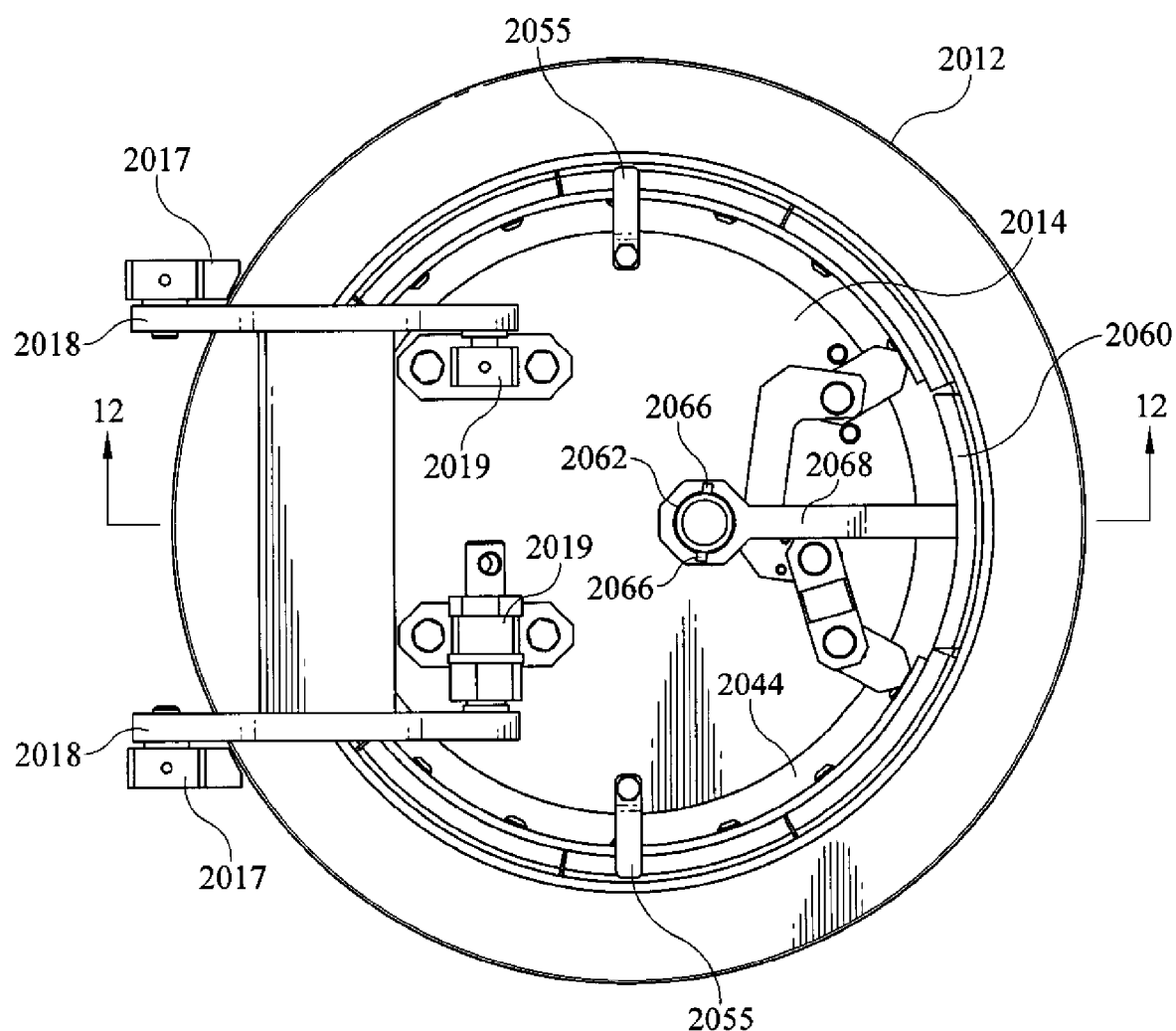
FIG. 11 is a front view of the closure of FIG. 9 in a closed position.
Figure 12:
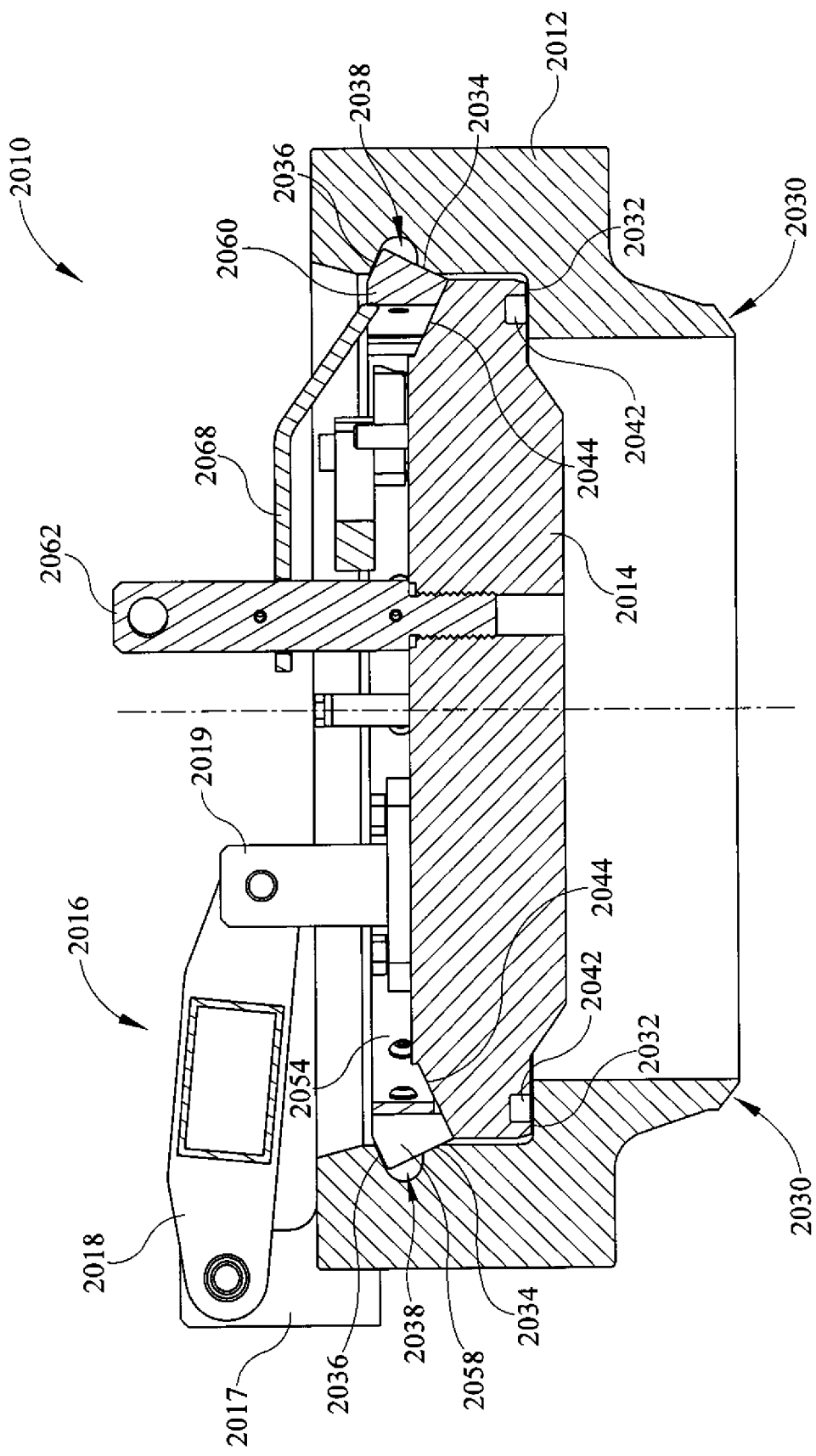
FIG. 12 is an upper cross-sectional view of the closure of FIG. 9 in the closed position.

Extending from the head 2014 is a locking ring linkage 2020. The linkage 2020 causes radial movement of a locking ring 2056 into a radially expanded, locked position once the head 2014 is closed within the opening of the hub 2012, as shown in FIGS. 9, 11, 12 or radially contracted or collapsed for opening of the head 2014 as shown in FIGS. 13-16. Once the locking ring 2056 is expanded and locks the head 2014 in a closed position relative to the hub 2012, the system to which the closure 2010 is connected may be pressurized.

Figure 10:
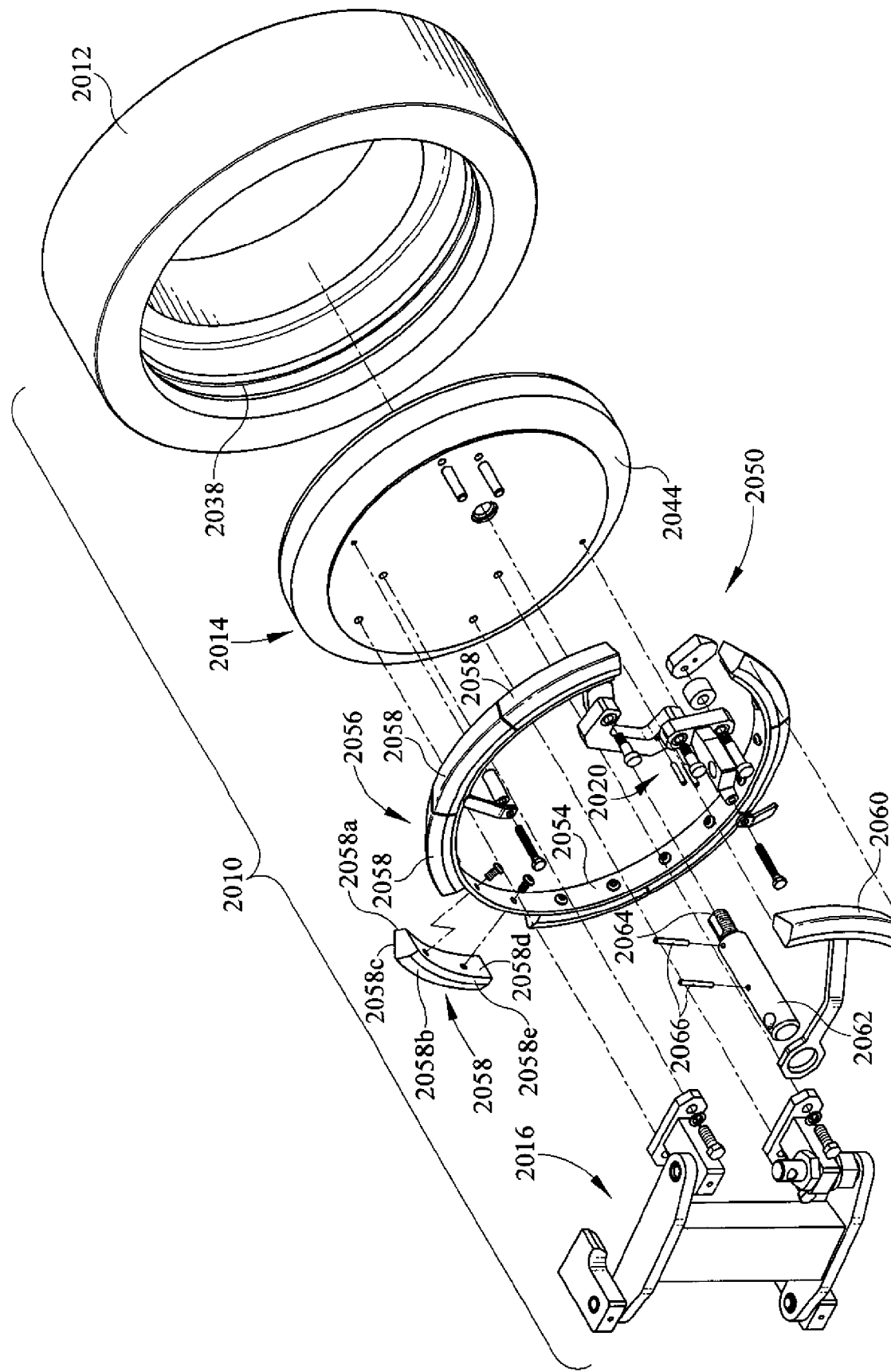
FIG. 10 is an exploded perspective view of the closure of FIG. 9.

Referring now to FIG. 10, the closure 2010 is depicted in an exploded view. From the right hand side of the Figure, the hub 2012 is shown. The hub 2012 is substantially cylindrical in shape having a hollow internal portion including a plurality of stepped surfaces within the inner portion of the hub 2012. The steps or internal profile of the hub 2012 receive the head 2014 and the locking ring 2056. The internal profile of the hub 2012 also defines a seat for the head 2014 as well as bearing surfaces of the locking ring 2056, as described further herein.

Moving to the left of the hub 2012, the head 2014 is depicted axially aligned with the aperture of the hub 2012. The head 2014 is also circular in shape having an outer diameter which substantially corresponds to the inside diameter of the hub 2012. More specifically, the outside diameter of the head 2014 corresponds to one of the inside diameters of a stepped surface within the hub 2012 so that the hub 2012 may be seated in a sealable fashion within the hub 2012. The head 2014 further comprises an inner surface, facing the hub 2012 and an outer surface facing away from the hub 2012. The outer surface of the head 2014 includes a tapered or angled head bearing surface 2044 along which portions of the locking assembly 2050 move. To the far left of the Figure, the hinge mechanism 2016 is depicted, which connects the head 2014 and hub 2012 and allows pivotal opening and closing of the head 2014 relative to the hub 2012.

Between the hinge mechanism 2016 and the head 2014, the locking assembly 2050 is depicted. The locking assembly 2050 includes a locking linkage 2020, a connecting ring 2054 and a locking ring 2056. Although the term ring is used, the rings 2054, 2056 are not completely circular and may be considered band-like in construction with first and second ends. Further, although the rings 2054, 2056 are manually actuable, the rings may be biased to one or both of an open or a closed position or may alternatively be unbiased, as shown and described. The locking ring 2056 is seated on the tapered bearing surface 2044 of the head 2014 for radial expansion and collapse. The exemplary locking ring 2056 is comprised of a plurality of arcuate elements or segments 2058. Each of the segments 2058 is defined by polygonal cross-section, including two parallel sides 2058a, 2058b. One of the sides is seated against the tapered surface 2044, while the opposite parallel surface is seated against a bearing surface 2036 (FIG. 12) of the hub 2012. A perpendicular surface 2058c extends between the two parallel surfaces and engages a first bearing surface 2034 of the hub 2012 as shown in FIG. 12. A radially innermost surface 2058d of the locking ring segments 2058 is oriented at an angle so as to be co-axial with the hub 2012 and allow connection of the connecting ring 2054 without requiring the connecting ring 2054 be conical in shape. The orientation of the innermost surface 2058d is provided in part by the angle of the connecting surface 2058e extending between the surfaces 2058b and 2058d. The cylindrical configuration of surface 2058d is advantageous since this allows use of a cylindrical shaped connecting ring 2054 which is decreased as opposed to many prior art types of devices utilizing conical rings. Also, the locking segment surface 2058c is a conical surface which engages the bearing surface 2034. Thus, the locking ring 2056 includes a substantially cylindrical surface includes both a substantially cylindrical surface and a substantially frusto-conical surface which is advantageous.

The locking ring segments 2058 are interconnected by the connecting ring 2054. Each of the segments 2058 includes first and second fastening apertures on the radially inner surface 2058d. The connecting ring 2054 includes a plurality of fastening apertures which are aligned with the pairs of fastening apertures on the segments 2058. Accordingly, each segment 2058 is connected by two fasteners to the connecting ring 2054. As the connecting ring 2054 is radially expanded by the linkage mechanism 2020, the locking ring 2056 also radially expands along the head bearing surface 2044, and into the groove or cavity 2038. In this position, the locking ring segments 2058 engage the first bearing surface 2034 and the second bearing surface 2036. The use of two fasteners allows the use of a thinner connecting ring or band 2054 and eases manufacture since the ring 2054 may be formed to have a cylindrical shape, rather than conical.

As shown in FIG. 10, the locking ring 2056 and the connecting ring 2054 are substantially C-shaped. In the gap between ends of the C-shaped rings 2056, 2054, an interlocking segment 2060 is positioned. The interlocking segment 2060 must be removed for the rings 2054, 2056 to be collapsed. Alternatively, the rings 2054, 2056 must be expanded for the interlocking segment 2060 to be positioned. The segment functions to inhibit collapse of the rings 2054, 2056 when the closure 2010 is pressurized.

Referring now to FIG. 11, a front view of the closure 2010 is depicted. The head 2014 and the hub 2012 are generally circular in shape. The head 2014 is depicted closed and seated against the shoulder 2032 (FIG. 12) of the hub 2012. As indicated by the position of locking ring linkage 2020, the connecting ring 2054 is pushed radially outward which forces the connecting ring outward along the bearing surface 2044 of the head 2014. With this radial expansion, the locking ring 2056 is seated within a groove or cavity 2038.

The connecting ring 2054 and locking ring 2056 are connected to one another by pairs of fasteners extending through the connecting ring 2054 and into each locking ring segment 2058. The use of two fasteners per segment 2058 has been found to be advantageous since the connecting ring 2054 maintains a rigid form along the segments 2058 and mostly bends in the area between the segments 2058. This provides greater control of the movement of the rings 2054, 2056 when the locking assembly 2050 is actuated.

The connection of the connecting ring 2054 and the locking ring 2056 to the linkage 2020 is the only constraint on the rings 2054, 2056. Thus, in the axial direction toward and away from the outer surface of the head 2014, there is no constraint. Accordingly, clips 2055 are positioned on the outer surface of the head 2014 and extend over portions of the connecting ring 2054 and locking ring 2056, so that the rings 2054 and 2056 cannot move away from the bearing surface 2044 of the head 2014. Therefore, the rings 2054, 2056 can move in the radial direction but not axially. The clips 2055 are useful when the head 2014 is in an opened position and the rings 2054, 2056 could otherwise move away from the head 2014.

Referring now to FIG. 12, the closure 2010 is depicted in an upper cross-sectional view with the head 2014 in a closed position, corresponding to FIG. 11. The head 2014 seated in the hub 2012 and the locking ring segment 2058 radially expanded to the locked position for pressurization. The hinge mechanism 2016 and the lower pairs of elements 2017, 2018, 2019 are depicted connecting the hub 2012 and the head 2014.

The hub 2012 comprises an open end 2030 by which the hub 2012 is connected to a pipe or vessel for access to the pressurized volume. It should be understood that the term pressure vessel is meant to encompass any type of pressurized system or body and should not be considered limited to a pipe or vessel. The hub 2012 comprises an outer surface positioned at an outer diameter and an inner surface at an inner diameter near the ends 2030. Moving from the end 2030 toward the door 2014, a shoulder 2032 is defined against which the head 2014 is seated. The hub 2012 extends from the end 2030 axially toward the hinge mechanism 2016.

Moving in an axially direction from the shoulder 2032 toward the second hinge arm 2018, the hub 2012 comprises a first locking ring bearing surface 2034, and a second bearing surface 2036 which is substantially perpendicular to the first bearing surface 2034. The first bearing surface 2034 is connected to the second bearing surface 2036 by a semicircular cavity 2038. Although the cavity 2038 is depicted as being semicircular, the cavity 2038 may take the form of various shapes which may receive a portion of a locking ring 2056, described further herein.

The head 2014 also comprises the tapered surface 2044 along which the locking ring 2056 and the connecting ring 2054 slide for radial motion. When the vessel area is pressurized, the angle of the surface 2044 causes a resultant force on the locking ring 2056 which acts radially outward. This drives the locking ring 2056 into the cavity 2038 and against the bearing surfaces 2034 and 2036 for additional locking capacity.

The head 2014 includes a seal cavity 2042. The seal cavity 2042 receives the seal for compressing between the head 2014 and the hub 2012. Any variety of the previously described seals may be utilized. Opposite the seal cavities 2042 are tapered surfaces 2044 near the peripheral edges of the head 2014. The tapered surface 2044 receives a locking ring and connecting ring which slide along the surface radially to engage the hub 2012 at the first and second bearing surfaces 2034, 2036. The tapered surface 2044 is substantially parallel to the second bearing surface 2036, and also substantially perpendicular to the first bearing surface 2034.

FIGS. 9-12 also depict a pressure warning device 2062 which is threadably positioned in the outer surface of the head 2014. The pressure warning device 2062 is generally cylindrical in shape and has a threaded post 2064 at one end of the assembly which is threadably received within the head 2014. The pressure warning device 2062 is a pressure release which emits an audible whistle when the pressure warning device is not fully sealed against the head 2014 and when the pressure is released prior to opening the head 2014. The pressure warning device 2062 includes a groove extending axially which allows air pressure to move past the threaded portion of the device and escape to atmosphere once the pressure warning device is loosened within a flow through aperture in the head 2014. This sealing may occur by o-ring, gasket or other such sealing device. Additionally, the pressure warning device 2062 also includes a pair of spaced apart pins 2066 which retain a segment arm 2068 there between. The segment arm 2068 is connected to the interlocking segment 2060 so that the interlocking segment 2060 is retained by the pins 2066 to the pressure warning device 2062. As previously indicated, the locking ring 2056 must be expanded to insert the interlocking segment 2060. Likewise, the segment 2060 must be removed in order to allow collapse of the locking ring 2056.

The pressure warning device 2062 has a secondary function of also acting as a locking device. As best seen in FIGS. 9 and 11, the link 2023 nearly engages the pressure warning device 2062 when the connecting ring 2056 is disposed an expanded position. During collapse, the link 2023 moves first in a clockwise direction and then a counterclockwise direction. However, in order to move initially in the clockwise direction, the pressure warning device 2062 must be removed, or else the link 2023 engages the pressure warning device, interfering and inhibits the collapse of the ring 2056. Otherwise stated, the link 2023 is constrained by the pressure warning device 2062. This causes release of pressure within the hub 2012 prior to opening of the head 2014. Similarly, due to the interference between the link 2023 and the pressure washer 2062, the locking ring 2056 must be expanded in order to insert the pressure warning device 2062. Such expansion also allows for the positioning and the insertion in the interlock segment 2060.

Figure 13:
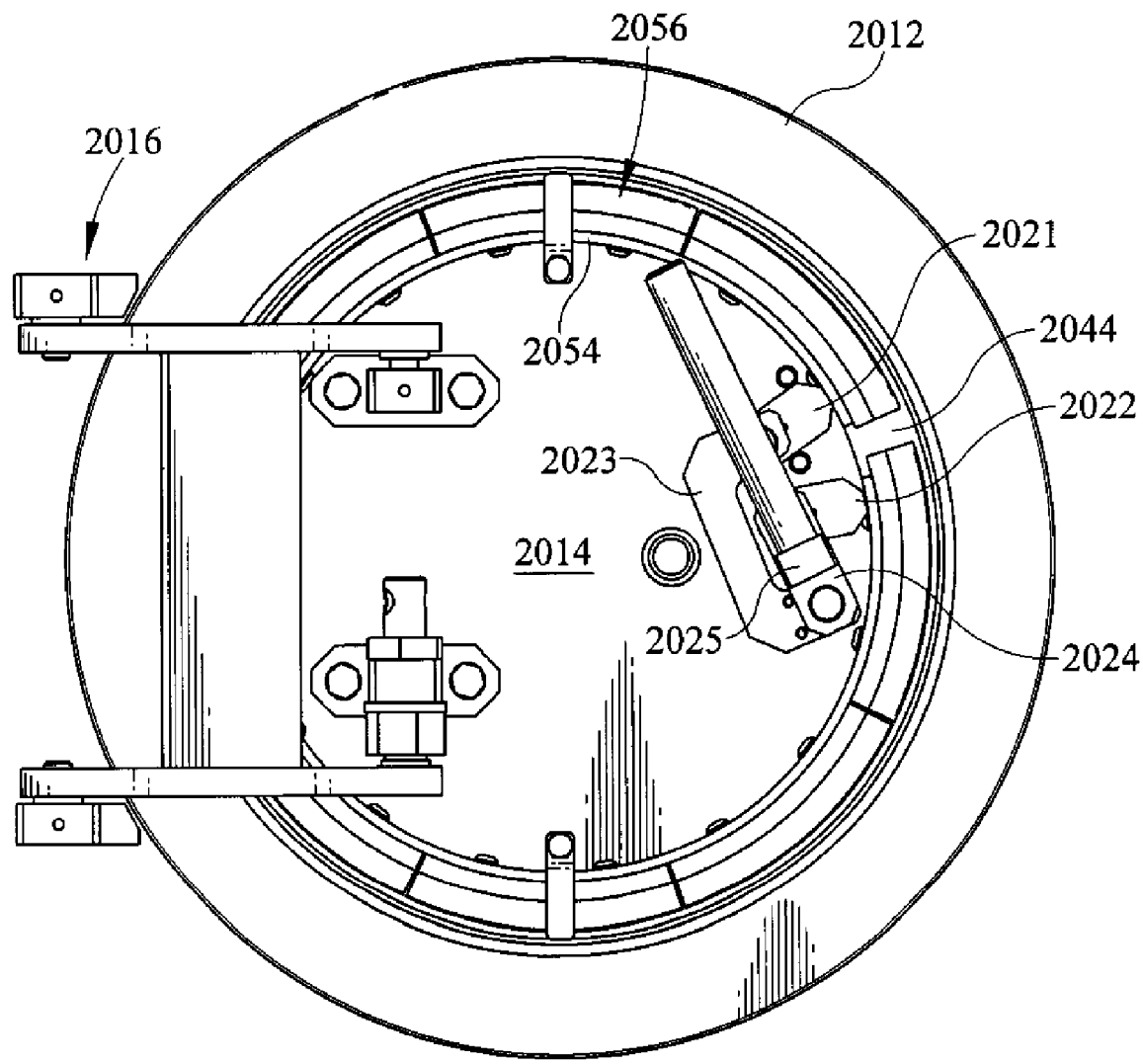
FIG. 13 is a front view of the closure with the safety-interlock segment removed and the locking ring in a collapsed position for opening.

Referring still to FIGS. 9, 12 and 13, the locking assembly 2050 comprises a locking linkage 2020. The linkage 2020 comprises a first lug 2021 and a second lug 2022. The first lug 2021 is connected to one end of the c-shaped connecting ring 2054. The second lug 2022 is connected to the second end of the c-shaped connecting ring 2054. Accordingly, when the lugs 2021, 2022 move, the connecting ring 2054 expands radially. The linkage 2020 further comprises a first link 2023 connected to the lug 2021 and a second link 2024 connected to the second lug 2022. At ends of each link 2023,2024 opposite the corresponding lugs 2021,2022, respectively, the links 2023,2024 are connected to each other. A pair of posts extend from the head 2014 to constrain motion of the first lug 2021. As shown in FIG. 9, a handle body 2025 extends from the link 2024. The body 2025 comprises an aperture wherein a handle or lever is positioned and rotated from the position shown to move to the position shown in FIG. 13. During rotation of the handle body 2025, the link 2023 rotates counter clockwise at the pivot between the link 2023 and lug 2021. Likewise, the link 2024 rotates counter-clockwise with the body 2025 about the pivot between link 2024 and link 2023. As the link 2024 moves counter clockwise, the second lug 2022 moves radially inwardly and circumferentially along the bearing surface 2044. It should be understood that a manual operator is described with the present embodiment, however various types of actuators may be utilized to facilitate contracting and expanding of the locking ring 2056 including hand operated devices, or powered operators such as electronic, hydraulic, pneumatic powered devices.

Referring now to FIG. 13, a front view of the closure 2010 is depicted, wherein the locking assembly 2050 and the locking ring linkage 2020 are moved to a radially contracted position for opening of the head 2014. As previously described, the link 2023 is pivoted counter clockwise and the link 2024 about 180 degrees so that the lugs 2021 and 2022 are moved toward one another in the area previously occupied by the interlocking segment 2060. In order to move the ends of the connecting ring 2054 and locking ring 2056 toward one another, the rings must move to a smaller radius position along the bearing surface 2044. As this motion occurs, the locking ring 2056 is removed from the locked position in the cavity 2038 of the hub 2012.

Figure 14:
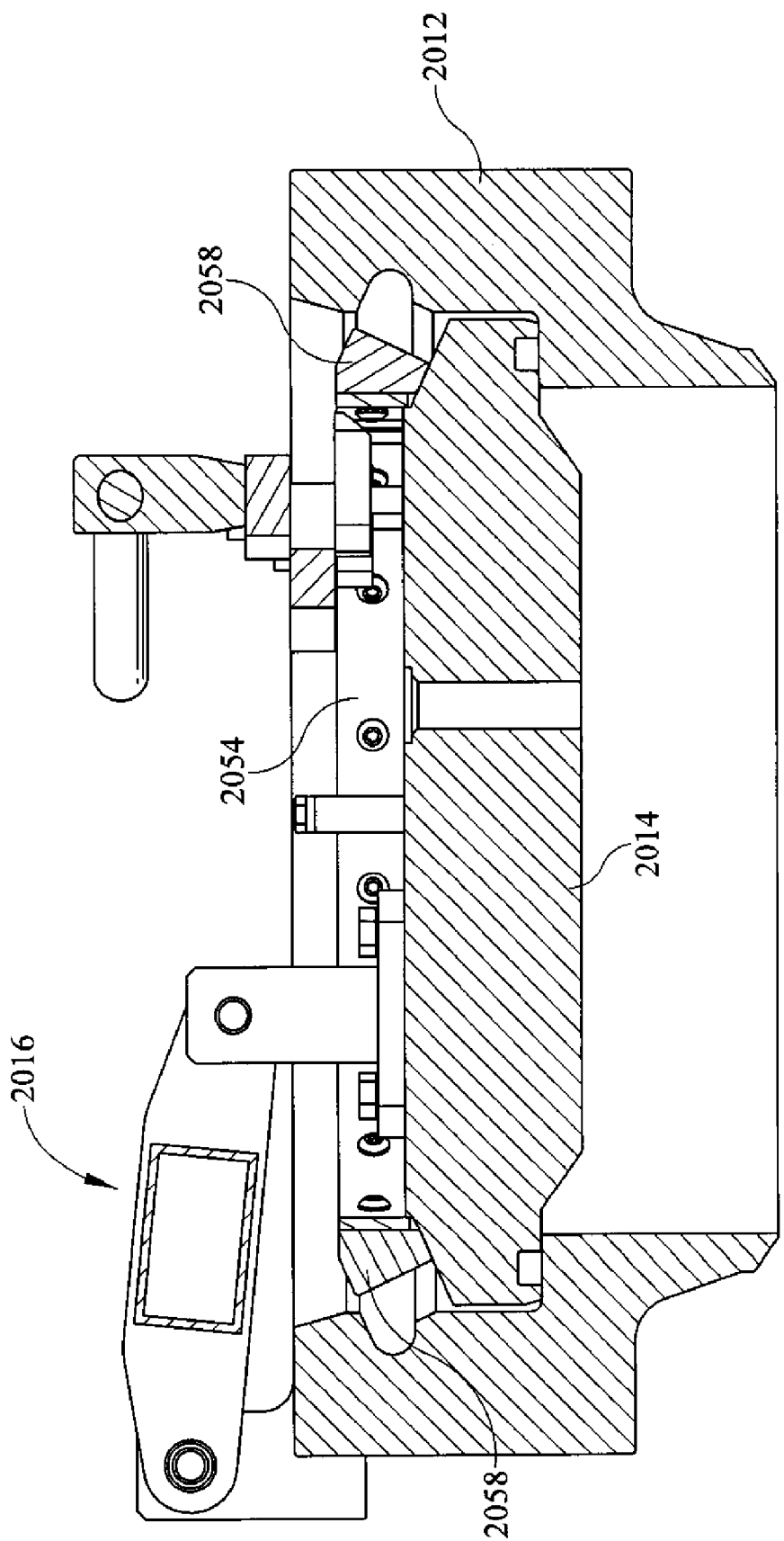
FIG. 14 is an upper cross-sectional view of the closure with the locking ring in the collapsed position for opening, as shown in FIG. 13.

Referring now to FIG. 14, the upper cross-sectional view of the closure 2010 shows the rings 2054, 2056 in the collapsed position. In this position, the rings 2054, 2056 are moved radially inward and out of the cavity 2038. With this movement, the head 2014 may be opened and removed from the hub 2012. As previously indicated, the use of two fasteners per segment 2058 provides rigidity for the connecting ring 2054 causing most of the flexing of the connecting ring 2054 to occur between the segments 2058.

Figure 15:
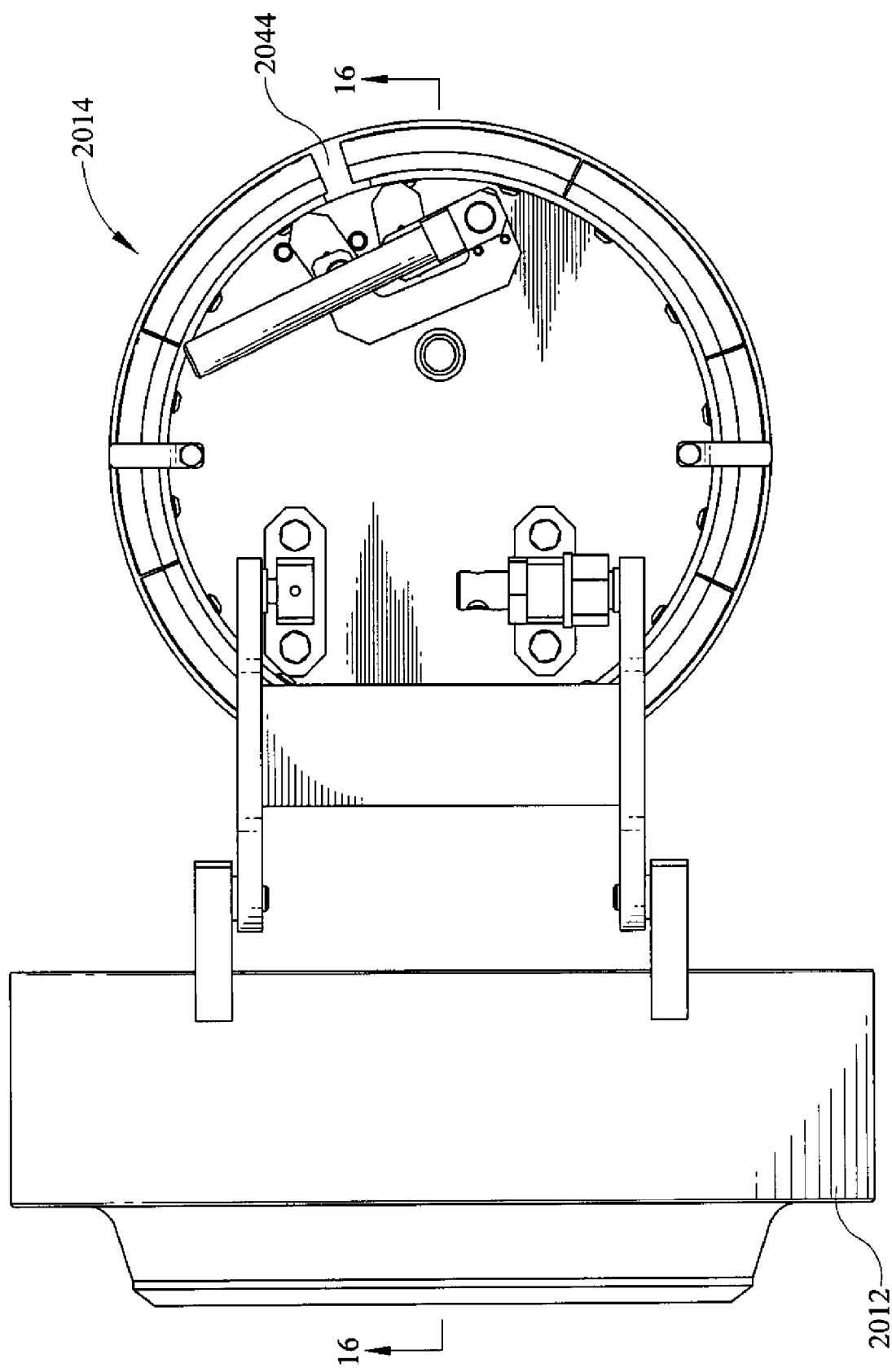
FIG. 15 is a side view of the closure with the locking ring collapsed and the head in an open position; and, FIG. 16 is an upper cross-sectional view of the closure in the open position shown in FIG. 15.
Figure 16:
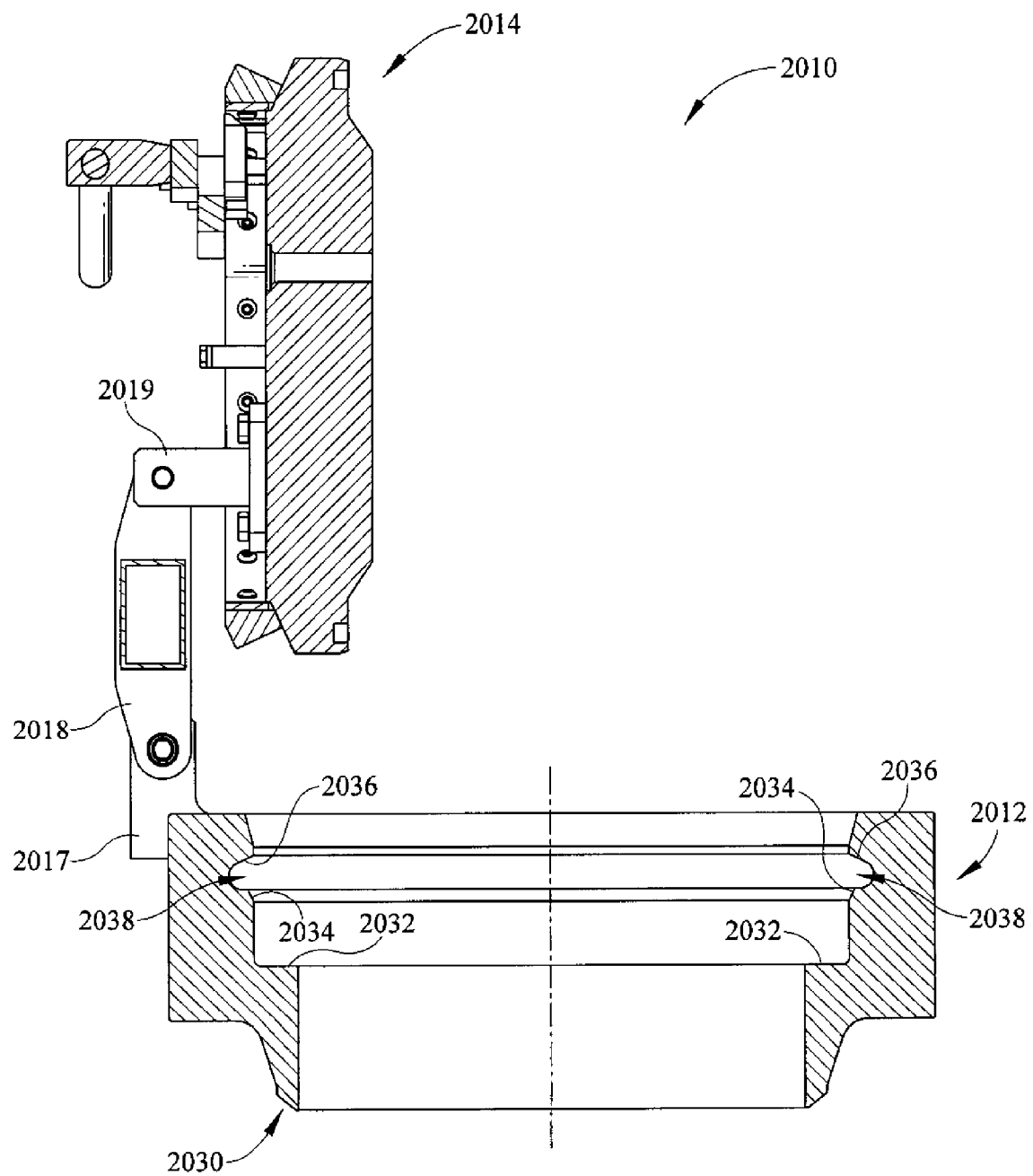

Referring now to FIGS. 15 and 16, the head 2014 is depicted in an open position and withdrawn from the hub 2012. As depicted, the locking ring 2056 has moved radially inwardly along the head bearing surface 2044. The locking ring 2056 is no longer positioned beyond the peripheral edge of the head 2014 but instead is collapsed allowing the head 2014 to be pulled open.

Those skilled in the art will appreciate that the closure of the present exemplary embodiments may be used in conjunction with various types of pressure vessels, including pipes, pressure tanks, storage tanks and other conventional vessels.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A pressure retaining closure for a pressurized vessel, comprising:
   a hub having an axis;
   a head having an inner surface and an outer surface and a peripheral edge, said head hingedly connected to said hub;
   a C-shaped locking ring, having a plurality of segments, disposed along said outer surface of said head in an angled head bearing surface adjacent to said peripheral edge;
   each of said segments having a polygonal cross-section including a radially inner surface and first and second fastening apertures extending through said radially inner surface of said segments;
   a C-shaped connecting ring, having a rectangular cross-section, positioned along said radially inner surfaces of said segments, said connecting ring having pairs of fastening apertures aligned with said first and second fastening apertures of each of said segments;
   wherein said radially inner surface of each of said segments defines a substantially cylindrical innermost surface supporting said C-shaped connecting ring and wherein said radially outer surface of each of said segments defines a frusto-conical locking ring outer surface;
   wherein said connecting ring is moveable to expand or collapse said locking ring from a first position, engaging said hub so that said frusto-conical locking ring outer surface engages an angled hub surface disposed at an angle to said axis for receiving said C-shaped locking ring, to a second position disengaging said hub allowing opening and closing of said head.

2. The closure of claim 1, said connecting ring being generally cylindrical in shape.

3. The closure of claim 1, said polygonal cross-section of each of said segments having five sides.

4. The closure of claim 1 further comprising a locking ring linkage having a first lug connected at a first end of said connecting ring and a second lug connected at a second end of said connecting ring.

5. The closure of claim 4 further comprising a first C-shaped link connected to said first lug and a second link connected to said second lug and said first C-shaped link.

6. A pressure retaining closure, comprising:
   a substantially circular hub having a groove along an inner surface said groove having a surface angled with respect to a hub axis;
   a substantially circular head pivotally connected to said hub for movement between an open position and a closed position, said head having an outer surface, an inner surface and an angled bearing surface near a peripheral edge of said substantially circular head;
   a connecting ring positioned near said angled bearing surface of said head, said connecting ring having fastening apertures;
   a locking ring defined by a plurality of locking ring segments, each of said segments having first and second fastening apertures corresponding to said fastening apertures of said connecting ring, said locking ring further comprising a conical surface disposed against said angled bearing surface;

wherein said radially innermost surface of each of said segments defines a substantially cylindrical inner surface supporting said C-shaped connecting ring and wherein said radially outer surface of each of said segments defines a frusto-conical locking ring outer surface;

said connecting ring fastened to said locking ring and wherein said locking ring is expandable by movement of said connecting ring between first and second positions, said first position being radially inward of said groove and allowing opening and closing of said hub, said second position being radially outward of said peripheral edge of said head and further wherein said connecting ring is seated in said groove and said angled ring surface engages said angled surface of said groove.

7. The pressure retaining closure of claim 6 further comprising a substantially cylindrically shaped connecting ring.

8. The pressure retaining closure of claim 7 further comprising a head bearing surface along which said connecting ring moves radially inwardly and outwardly.

9. The pressure retaining closure of claim 8 said head bearing surface being tapered and forcing said locking ring outward toward a locked position during pressurization.

10. The pressure retaining closure of claim 4 further comprising an interlocking segment connected to a pressure warning device, said interlocking segment disposed between ends of said locking ring.

11. A pressure retaining closure, comprising:
a hub having a round opening and a peripheral groove, said hub being circular and said groove extending into said hub at an angle that is non-perpendicular to an axis of said hub;
a head pivotally connected to said hub, said head having a peripheral bearing surface which is tapered;
a locking ring defined by a plurality of arcuate segments of polygonal cross-section and having pairs of fastening apertures, said locking ring being movable between a first disengaged position and a second engaged position wherein said locking ring is at least partially disposed in said groove;
a connecting ring having a plurality of fastening apertures aligned with said pairs of fastening apertures of said arcuate segments and receiving a bolted connection;
said connecting ring fastened to said locking ring along a radially inward surface of said locking ring;
said locking ring having a substantially frusto-conically shaped outer surface and a substantially cylindrically innermost surface for receiving said cylindrically shaped connecting ring;
said substantially cylindrical radially innermost surface supporting said connecting ring.

12. The pressure retaining closure of claim 11, each of said plurality of segments having two angled surfaces which engage said hub.

13. The pressure retaining closure of claim 12, each of said plurality of segments further comprising an angled surface which slides along an angled bearing surface of said head.

14. A pressure warning device for a closure, comprising:
a hub for attachment to a pressure vessel;
a head hingedly attached to said hub, said head having a substantially peripheral head bearing surface, said substantially peripheral head bearing surface being angled;
a pressure warning device connected to an outer surface of said head;
a linkage for expanding a locking ring between a first collapsed position to a second expanded position;
said linkage having at least one link which engages said pressure warning device during movement of said linkage inhibiting collapse of said locking ring;
wherein said connecting ring is moveable to expand or collapse said locking ring from a first position engaging said hub to a second position disengaging said hub allowing opening and closing of said head.

15. The pressure warning device of claim 14 further comprising a interlock segment connected to said pressure warning device for positioning between first and second ends of said locking ring.

16. The pressure warning device of claim 14 wherein said pressure warning device is positioned adjacent said linkage after said locking ring is expanded.

17. The pressure warning device of claim 16 wherein said pressure warning device is removed from said head before said locking ring is collapsed.

18. The pressure warning device of claim 17 wherein said pressure warning device is a locking device.

19. A pressure warning device for use with a closure, comprising:
a hub having an opening therein;
a head hingedly attached to said hub and closing said opening of said hub;
a pressure release opening in said head in fluid communication with said hub when said head is in a closed position within said hub;
a locking ring defined by a plurality of segments connected to a linkage, said linkage moving said locking ring between an expanded position engaging said hub and a collapsed position disengaging said hub;
a connecting ring fastened to said plurality of segments of said locking ring;
said locking ring having a conical surface which is parallel to and slidably engages a bearing surface near a peripheral edge of said head;
said locking ring having a radially innermost surface on which a cylindrical connecting ring is positioned, said radially innermost surface being co-axial with said hub;
a pressure warning device positioned in said pressure release opening and interfering with a travel path of said linkage to inhibit collapse of said locking ring before said pressure warning device is removed.

20. The pressure warning device of claim 19 further comprising an interlock segment connected to said pressure warning device.

21. The pressure warning device of claim 20 further comprising an arm connected to said pressure warning device and said interlock segment.

22. The pressure warning device of claim 19 wherein said pressure warning device is positioned adjacent said linkage after said locking ring is expanded.

23. The pressure warning device of claim 19 wherein said pressure warning device is removed from said head before said locking ring is collapse.

24. The pressure warning device of claim 19, said pressure warning device having an axially extending groove allowing release of pressurized air.

25. A pressure warning device for use with a closure, comprising:
a hub having a hollow interior;
a head pivotally connected to said hub;

a flow through aperture in said head allowing flow communication with said hollow interior when said head is pivotally closed;

a locking ring for locking said head within said hub, said locking ring movable from a collapsed unlocked position, to an expanded locked position;

said locking ring further comprising a conical surface which slides along said head, a connecting ring positioned on an angled surface of said locking ring, said angled surface being co-axially oriented with said hub due to said conical surface;

a pressure warning device disposed in said flow through aperture of said head and extending from said flow through aperture;

a locking ring linkage positioned on an outer surface of said head adjacent said flow through aperture, said linkage engaging said pressure warning device when said linkage moves said locking ring from said expanded locked position to a collapsed unlocked position.

26. The pressure warning device of claim 25 further comprising a pressure release groove.

27. The pressure warning device of claim 25 wherein said pressure warning device interferes with a path of said linkage.

28. The pressure warning device of claim 27, said pressure warning device being a locking device inhibiting collapse of said linkage.

29. The pressure warning device of claim 25, said connecting ring being bolted to said locking ring.

30. The pressure warning device of claim 29, said locking ring linkage having a first lug connected to one end of said connecting ring and a second lug connected to said second end of said connecting ring.

31. The pressure warning device of claim 30, said locking ring linkage further comprising a first link pivotally connected to said first lug and a second link pivotally connected to said second lug, and said first and second links pivotally connected to each other.

* * * * *